US012665429B2

(12) United States Patent
Khan et al.

(10) Patent No.: US 12,665,429 B2
(45) Date of Patent: Jun. 23, 2026

(54) VOLTAGE REGULATION CONTROLLER FOR MICROGRIDS WITH RENEWABLES AND HYBRID ENERGY STORAGE

(71) Applicant: KING FAHD UNIVERSITY OF PETROLEUM AND MINERALS, Dhahran (SA)

(72) Inventors: Khalid Abdullah Khan, Dhahran (SA); Muhammad Khalid, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 819 days.

(21) Appl. No.: 18/073,960

(22) Filed: Dec. 2, 2022

(65) Prior Publication Data

US 2023/0216308 A1     Jul. 6, 2023

Related U.S. Application Data

(60) Provisional application No. 63/297,029, filed on Jan. 6, 2022.

(51) Int. Cl.
H02J 3/38 (2026.01)
H02J 103/35 (2026.01)
(52) U.S. Cl.
CPC ........... H02J 3/381 (2013.01); *H02J 2103/35* (2026.01)
(58) Field of Classification Search
CPC .......... H02J 3/381; H02J 2203/10; H02J 3/28; H02J 3/32; H02J 7/34; H02J 7/345; H02J 7/35; H02J 2103/35
(Continued)

(56) References Cited

U.S. PATENT DOCUMENTS

| | | | |
|---|---|---|---|
| 7,411,308 B2 | 8/2008 | Parmley | |
| 7,786,620 B2 | 8/2010 | Vuk et al. | |

(Continued)

FOREIGN PATENT DOCUMENTS

CN     111181236 A     5/2020

OTHER PUBLICATIONS

DC Grid Voltage Regulation Using New HESS Control Strategy; Sathish Kumar Kollimalla, Mahesh K. Mishra, Abhisek Ukil, & H.B. Gooi.; IEEE Transactions on Sustainable Energy, vol. 8, No. 2, Apr. 2017 (Year: 2017).*

(Continued)

*Primary Examiner* — Jared Fureman
(74) *Attorney, Agent, or Firm* — Oblon, McClelland, Maier & Neustadt, L.L.P.

(57)     ABSTRACT

The present disclosure envisages a hybrid energy storage system (HESS) for power management of a microgrid. The system includes a plurality of renewable energy sources (RES), a plurality of power converters, a DC bus and a power management controller. Each RES is configured to generate a current $I_{RES}$. Each RES is connected to a power converter. Each power converter generates a DC voltage $V_{dc}$ from the current $I_{RES}$. The DC bus is connected to the plurality of power converters. The DC bus receives the DC voltage $V_{dc}$. The power management controller controls a battery energy storage system (BESS) and a supercapacitor energy storage system (SCSS). The BESS includes a battery which is connected to receive the DC voltage $V_{dc}$ and generate a battery current $i_{batt}$. The SCSS includes a supercapacitor which is connected to receive the DC voltage $V_{dc}$ and generate a supercapacitor current $i_{SC}$.

15 Claims, 25 Drawing Sheets

400 —

(58) Field of Classification Search
USPC ....... 320/101, 107, 108, 127, 137, 141, 167;
307/46, 58, 69, 80, 82
See application file for complete search history.

(56) References Cited

U.S. PATENT DOCUMENTS

| | | | |
|---|---|---|---|
| 8,310,104 B2 * | 11/2012 | Gengenbach | H02M 7/68 |
| | | | 307/87 |
| 8,946,929 B2 | 2/2015 | Singh et al. | |
| 9,013,066 B2 | 4/2015 | Kojori et al. | |
| 9,293,917 B2 * | 3/2016 | Zhou | H02J 7/34 |
| 9,489,701 B2 * | 11/2016 | Emadi | G06Q 50/06 |
| 9,535,480 B2 * | 1/2017 | Ye | G06F 1/263 |
| 9,536,205 B2 | 1/2017 | Ye et al. | |
| 10,003,200 B2 * | 6/2018 | Budde | H02J 7/35 |
| 10,110,000 B2 * | 10/2018 | Rozman | H02J 1/02 |
| 10,283,966 B2 * | 5/2019 | Macdonald | H02J 3/381 |
| 10,326,280 B1 * | 6/2019 | Sarwat | H02J 3/28 |
| 10,486,836 B2 * | 11/2019 | Rozman | B64G 1/425 |
| 12,218,506 B2 * | 2/2025 | Abianeh | H02J 7/0063 |
| 12,312,211 B2 * | 5/2025 | Valdivia Guerrero | H02M 1/10 |
| 2011/0273130 A1 | 11/2011 | Lee et al. | |
| 2013/0099581 A1 * | 4/2013 | Zhou | H02J 7/34 |
| | | | 307/82 |
| 2014/0339902 A1 | 11/2014 | Sepe, Jr. et al. | |
| 2016/0378085 A1 * | 12/2016 | Guo | G06F 1/26 |
| | | | 700/295 |
| 2017/0063124 A1 * | 3/2017 | Yu | H02J 7/345 |
| 2020/0169083 A1 * | 5/2020 | Zubieta | H02J 1/06 |
| 2022/0238943 A1 | 7/2022 | Denysenko et al. | |

OTHER PUBLICATIONS

Improving the Transient Response of Hybrid Energy Storage System for Voltage Stability in DC Microgrids Using an Autonomous Control Strategy; Khalid Abdullah Khan & Muhamman Khalid, Jan. 20, 2021. (Year: 2021).*

Pawitan, et al. ; MPC-Based Power Management of Renewable Generation Using Multi-ESS Guaranteeing SoC Constraints and Balancing ; IEEE Access; vol. 8, Jan. 22, 2020 ; 10 Pages.

* cited by examiner

500

502

504

506

504

510

DC Bus

504

508

516

DC Loads

BATTERY

SUPER CAPACITOR

FLYWHEEL

512

AC Loads

514

1800

VOLTAGE REGULATION CONTROLLER FOR MICROGRIDS WITH RENEWABLES AND HYBRID ENERGY STORAGE

CROSS REFERENCE TO RELATED APPLICATIONS

The present application claims the benefit of priority to U.S. Prov. App. No. 63/297,029, entitled "Voltage Regulation Controller For Microgrids With Renewables And Hybrid Energy Storage", filed on Jan. 6, 2022, and incorporated herein by reference in its entirety.

STATEMENT OF ACKNOWLEDGEMENT

The inventors acknowledge the financial support in part by the Deanship of Research, King Fahd University of Petroleum and Minerals, under Project Numbers DF191011 and RG171009, and in part by the King Abdullah City for Atomic and Renewable Energy K. A. CARE Energy Research and Innovation Center.

BACKGROUND

Technical Field

The present disclosure is directed to a voltage regulation controller for microgrids with renewables and hybrid energy storage.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Energy sources include renewable energy sources and non-renewable energy sources (such as fossil fuels). The use of non-renewable energy sources may cause environmental pollution and the depletion of the source itself. Therefore, research into renewable energy sources (RESs) has grown in recent years.

A microgrid is an active distribution network that incorporates interconnected loads and distributed RESs. By incorporating the microgrid, the supply of power is more reliable, with reduced power losses and improved power quality. An RES is intermittent in nature as it depends on environmental factors and may be time-constrained, leading to a demand-generation mismatch. Several problems are associated with renewable energy sources, for example, poor power quality, meager load following, generation-load mismatch, voltage instability, frequency deviation, and intermittent output power. To alleviate these problems, energy storage systems (ESS) are employed in the microgrid. Most commonly, due to high energy density, battery energy storage systems (BESS) are employed as the ESS. The BESS is suitable for steady-state fluctuations. The lifespan of the BESS is reduced due to high current stress, specifically experienced during abrupt or transient power variations, thereby limiting the use of the BESS. A supercapacitor storage system (SCSS) is employed as a short time driving power supply, which improves the dynamic property and the economic efficiency of the microgrid and which is able to absorb the transient power variation. Hence, hybridization of the BESS with the SCSS is advantageous.

A hybrid energy supply system (HESS) includes the SCSS and the BESS, having characteristics of both the SCSS and the BESS. The HESS is configured to provide high energy density, high power density, optimal life cycle, and relatively faster dynamic response, while maintaining all economic viability. The HESS includes a controller for enabling a smooth transition and power allocation of the BESS and SCSS based on their technical characteristics. In conventional microgrids, interoperability of the BESS and SCSS is achieved by employing several distinctive techniques and control algorithms. In a conventional HESS, a power reference is derived using a high-pass filter (HPF). The power is controlled in a closed-loop manner using PI controllers. In another existing HESS, the power allocation strategy between the BESS and SCSS is based on a low-pass filter (LPF), providing enhanced and improved performance of the control strategy in comparison to HPF.

Current HESS strategies focus on the generation of BESS and SCSS current references using a filter-based control strategy. An error signal is obtained by the PI controller from a DC bus. The PI controller generates the reference current required for voltage regulation on the DC bus. The reference current is separated, using the LPF, into a low-frequency component and a high-frequency component. The low-frequency component serves as an activating signal for switching the BESS and the high-frequency component serves as a switching signal for the SCSS.

However, these filter-based HESS strategies have disadvantages, such as power components which are not optimally separated by the filters. To obtain the optimal splitting of the power components, the filter parameters and the cut-off frequency have to be adjusted meticulously and distinctively for different loading conditions. Furthermore, these microgrids require additional voltage and current sensing devices for proper implementation, which negatively affects the overall response.

Accordingly, it is one object of the present disclosure to provide a controller for microgrids that regulates a DC bus voltage and improves the power quality during transient or abrupt power variations in the microgrid.

SUMMARY

In an exemplary embodiment, a hybrid energy storage system (HESS) for power management of a microgrid is described. The system includes a plurality of renewable energy sources (RES) located within the microgrid, wherein each RES is configured to generate a current $I_{RES}$, a plurality of power converters, wherein each RES is connected to a power converter, wherein each power converter generates a DC voltage $V_{dc}$ from the current $I_{RES}$, a DC bus connected to the plurality of power converters, wherein the DC bus is configured to receive the DC voltage $V_{dc}$, a power management controller configured to control: a battery energy storage system (BESS) including a battery, wherein the battery is connected to receive the DC voltage $V_{dc}$ and generate a battery current $I_{batt}$, and a supercapacitor energy storage system (SCSS) including a supercapacitor, wherein the supercapacitor is connected to receive the DC voltage $V_{dc}$ and generate a supercapacitor current $I_{SC}$.

In another exemplary embodiment, a method for power management of a hybrid energy storage system (HESS) of a microgrid is described. The method includes generating, by a plurality of renewable energy sources (RES) located within the microgrid, a current $I_{RES}$. The method includes receiving, by a DC bus connected to the plurality of power converters, the DC voltage $V_{dc}$. The method further includes receiving, by a battery of a battery energy storage system (BESS), the DC voltage $V_{dc}$ and generating a battery current $I_{batt}$. The method further includes receiving, by a supercapacitor of a supercapacitor energy storage system (SCSS), the DC voltage $V_{dc}$ and generating a supercapacitor current $I_{SC}$.

In another exemplary embodiment, a non-transitory computer readable medium having instructions stored therein that, when executed by one or more processors, cause the one or more processors to perform a method for power management of a hybrid energy storage system (HESS) of a microgrid is described. The method includes generating, by a plurality of renewable energy sources (RES) located within the microgrid, a current $I_{RES}$. The method includes generating, by a plurality of power converters, wherein each RES is connected to a power converter, a DC voltage $V_{dc}$ from the current $I_{RES}$. The method includes receiving, by a DC bus connected to the plurality of power converters, the DC voltage $V_{dc}$. The method includes receiving, by a battery of a battery energy storage system (BESS), the DC voltage $V_{dc}$ and generating a battery current $I_{batt}$. The method includes receiving, by a supercapacitor of a supercapacitor energy storage system (SCSS), the DC voltage $V_{dc}$ and generating a supercapacitor current $I_{SC}$.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
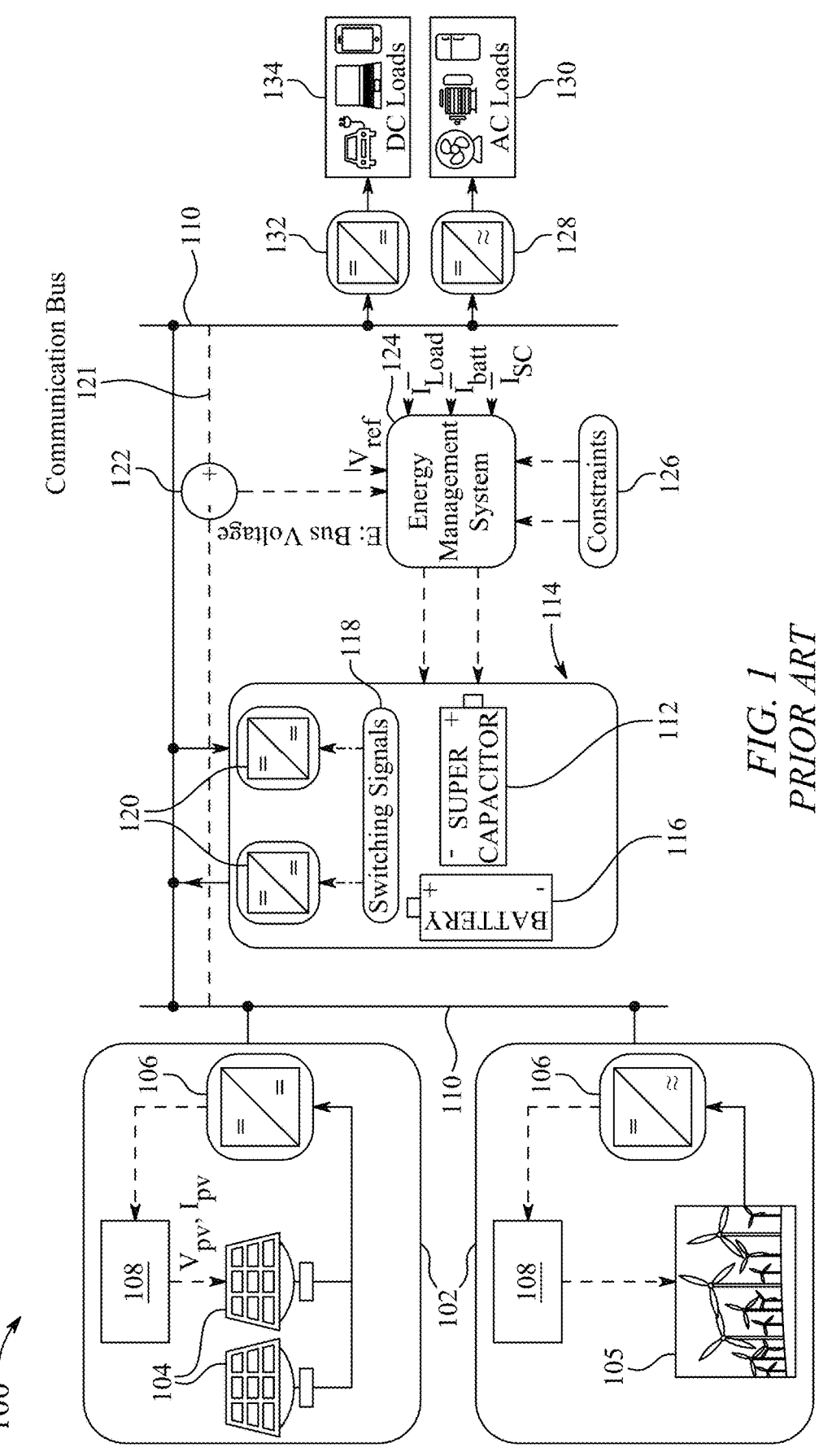
FIG. 1 illustrates a block diagram of a conventional microgrid integrated with a hybrid energy storage system (HESS)

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of the present disclosure are directed to a hybrid energy storage system (HESS) for power management of a microgrid, and a method for power management of the HESS.

In the present disclosure, the battery current may be alternately referred to as $I_{batt}$ and $i_{batt}$, which terms are to be interpreted as synonymous.

In the present disclosure, the supercapacitor current may be alternately referred to as $I_{SC}$ and $i_{SC}$, which terms are to be interpreted as synonymous.

The HESS employs a decoupled based control strategy for harnessing the dominant characteristics of a battery energy storage system (BESS) and a super-capacitor storage system (SCSS) towards voltage regulation in the microgrid. The present disclosure provides a controller for improving a transient response of the SCSS. In an aspect, the controller is a type II compensator and a non-linear PI controller (NPIC) for BESS and SCSS, respectively. Using a suitable pole and zero placement and through the error signal measured at a direct current (DC) bus, the type II compensator is configured to generate a suitable reference current for the BESS, with slow dynamics and activates an operation of the BESS towards average energy demand of the microgrid. Similarly, the NPIC controller utilizes a look-up table (LUT) to operate the PI controller and generates a reference current for SCSS in accordance with the required transient response towards DC bus voltage regulation.

The decoupled control strategy was tested for voltage regulation in a stand-alone microgrid. Furthermore, a comparative analysis is presented with a benchmark low-pass filter (LPF) based controller. The results obtained from the comparison show that the decoupled control strategy possessed a faster response with improved voltage regulation capabilities. In an example, the test system was regulated at 48 V for various abrupt load-generation, and the controller was able to maintain a significantly reduced voltage deviation between 47 V to 51 V in contrast to 45 V to 56 V observed in a conventional LPF-based control strategy. Furthermore, the HESS has lower complexity compared to the LPF based control strategy. In an aspect, the present system may include additional sensing devices that inherently reduce the detrimental effect on ESS response during transient conditions.

FIG. 1 illustrates a block diagram of a conventional microgrid 100 integrated with a hybrid energy storage system (HESS) 114. Referring to FIG. 1, the conventional microgrid 100 includes a renewable power generating unit 102, a point of common coupling (PCC) 110, the hybrid energy storage system 114, and a plurality of loads (i.e., an AC load 130, a DC load 134). The conventional microgrid 100 is a local energy system which incorporates three key operational blocks, which are: generation of electricity, storage of electricity and the provision of electricity on demand to the plurality of loads. In an aspect, the microgrid may or may not be connected to the grid (utility grid).

The renewable power generating unit 102 may include various types of renewable energy generating devices or renewable energy sources (RES) such as a photovoltaic (PV) array 104, a wind turbine 105, and a plurality of converters (DC-DC converter, AC-DC converter) 106. The renewable power generating unit 102 is configured to generate an electric current. The renewable power generating unit 102 is configured to employ a maximum power point tracking (MPPT) algorithm 108. The renewable power generating unit 102 includes the DC-DC converter 106 that converts a direct current (DC) from one voltage level to another level. The DC-DC converter 106 is configured to produce a voltage that is regulated and consistent.

In an aspect, the PV array 104 includes a plurality of PV modules, and a DC/DC converter 106, such that the solar energy is converted into electric energy and transmitted to a direct current bus. In an example, the PV array 104 includes a power inverter which converts the direct current (DC) output of the PV array 104 into a utility frequency alternating current (AC) that can be fed into a commercial electrical grid or used by a local, off-grid electrical network.

In an aspect, the MPPT algorithm 108 is implemented in the plurality of inverters coupled with the renewable energy generating devices. For example, the MPPT algorithm 108 is configured to continuously adjust an impedance of the PV array 104 to keep the PV array 104 operating at, or close to, the peak power point of the PV array 104 under varying conditions, like changing solar irradiance, temperature, and load. The MPPT algorithm controls the voltage to ensure that the system operates at "maximum power point" (or peak voltage) on a power voltage curve.

In an aspect, the wind power plant 105 is configured to convert the wind energy into electric energy. The wind power plant 105 includes a synchronous generator, the AC-DC converter 106 and a DC-DC voltage stabilizing module which are sequentially connected to convert the wind energy into the electric energy. The wind power plant 105 also includes the MPPT algorithm 108. The MPPT algorithm 108 is configured to change the output voltage of the wind power plant 105 to track the maximum power point.

In an aspect, the PCC 110 is a point at which the HESS 114 is interfaced with the renewable power generating unit 102 and the plurality of loads. In some examples, the PCC 110 acts as an interface through which the generated energy from the renewable power generating unit 102 passes to an external network, such as a utility. In an aspect, the PCC 110 is a common interconnection point for different customers connected to the same utility power supply. In an example, the PCC 110 is a DC bus that is connected to the plurality of power converters. The DC bus is configured to receive the DC voltage $V_{dc}$ from the plurality of power converters.

As shown in FIG. 1, the HESS 114 includes a battery energy storage system (BESS) 116, a super-capacitor storage system (SCSS) 112, and the energy management system 124. The HESS 114 stores electric energy provided by the PV array 104 and the wind power plant 105 and is further configured to provide the electric energy for the direct current bus. The HESS 114 is configured to increase energy efficiency by storing generated electric energy and selectively use the stored electric energy when the electric energy is needed.

The BESS 116 includes rechargeable batteries that store electrical energy received from each renewable power generating unit 102 and discharges it when needed. In an example, the rechargeable batteries can also receive electrical energy from various other sources, such as diesel generators. The BESS 116 provides backup power and improves the stability of the microgrid 100. For example, the BESS 116 includes several primary components, including one or more rechargeable batteries, monitoring and control systems, and a power conversion system.

The SCSS 112 includes supercapacitors (SCs) as energy storage devices that bridge the gap between batteries and conventional capacitors. The SCs can store more energy than conventional capacitors and supply the stored energy at higher power outputs than batteries.

The energy management system 124 includes a communication bus 121, and an adder 122. Using the communication bus 121, the energy management system 124 is configured to receive an amount of electricity generated by the renewable power generating unit 102 at a particular time and an demand (power consumption by the loads attached to the microgrid 100). The adder 122 is configured to receive the amount of generated electricity and the demand and is further configured to retrieve the difference between the demand and the generated electricity. The adder 122 detects any anomaly between the demand for power and the power generation. On detection of the anomaly, the adder 122 generates an error signal to be fed to an energy management system 124. In an example, the error signal represents a bus voltage. In case, the demand is more than the generated electricity, the error signals indicates more utilization of the energy stored in the HESS 114. If the demand is less than the generated electricity, then the error signals indicates the energy management system 124 to store the generated electricity in the BESS 116, and the SCSS 112.

The energy management system 124 ensures safety and maximizes performance. The energy management system 124 prevents individual cells from overcharging, and controls charge and discharge of the battery. The energy management system 124 supports the reliable functionality of the microgrid 100, maximizes the penetration of renewable energy, and optimizes the cost and economic efficiency in an associated electricity market. To achieve such techno-economic and environmental objectives, the energy management system 124 has to solve optimization problems for the available production and storage capacity based upon various constraints 126. For example, the constraints 126 include market price, real-time state, and operational constraints of the microgrid, production, and consumption forecasting information. Based upon the constraints 126 and the error signals, the energy management system 124 is configured to generate a plurality of signals for controlling the functioning of the BESS 116 and the SCSS 112. The energy management system 124 is configured to receive battery current ($i_{batt}$), supercapacitor current ($i_{SC}$), and load current (iLoad). In an aspect, the energy management system 124 is configured to fetch a reference voltage (Vref) stored in a memory. The energy management system 124 is configured to separate load power into two components named: a high-frequency component and a low-frequency component. The high-frequency component is transmitted as a reference to the SCSS 112, and the low-frequency component is transmitted to the BESS 116. The HESS 114 is configured to receive the plurality of signals from the energy management system 124 and generates switching signals 118 for each of the BESS 116 and the SCSS 112. Corresponding to each switching signal, the BESS 116 and the SCSS 112 are configured to deliver the stored electricity to the plurality of loads via the PCC 110. In an aspect, the BESS 116 and the SCSS 112 may deliver the electricity at the same time. In an example, the BESS 116 and the SCSS 112 may deliver the electricity in a predetermined sequence. The HESS 114 includes a plurality of DC-DC converters 120 for converting direct current (DC), received from the BESS 116 and the SCSS 112, from one voltage level to another level.

The plurality of loads 130, 134 are connected to the microgrid 100 via the PCC 110. Endpoints of the microgrid 100 are consumer locations where electricity is used to power various equipment such as lighting equipment, television devices, dishwasher equipment, or such equipment (acting as a plurality of loads 130, 134 for the microgrid 100). In an example, the DC load 134 is connected to the PCC 110 via the DC-DC converter 132. In another example, the AC load 130 is connected to the PCC 110 via a DC-AC converter 128 that converts DC (direct current) to AC (alternating current).

Voltage regulation is an important parametric aspect for increasing solar PV penetration in a power network. Solar PV penetration is defined as a ratio of the total amount of solar PV energy exported to the power network and a total energy consumption of the solar PV. The solar PV penetration has a significant impact on active and reactive power losses. Considering the architecture of the microgrid 100 as shown in FIG. 1, the objective of the HESS 114 is to apply compartmentalization and allocation of unpredictable RES and load power variations in the power network. Slow or average power demands are suitable for the BESS 116, and fast or peak transient power requirements are compensated by the SCSS 112. To achieve the optimal power allocation, an efficient HESS operation is required.

Figure 2:
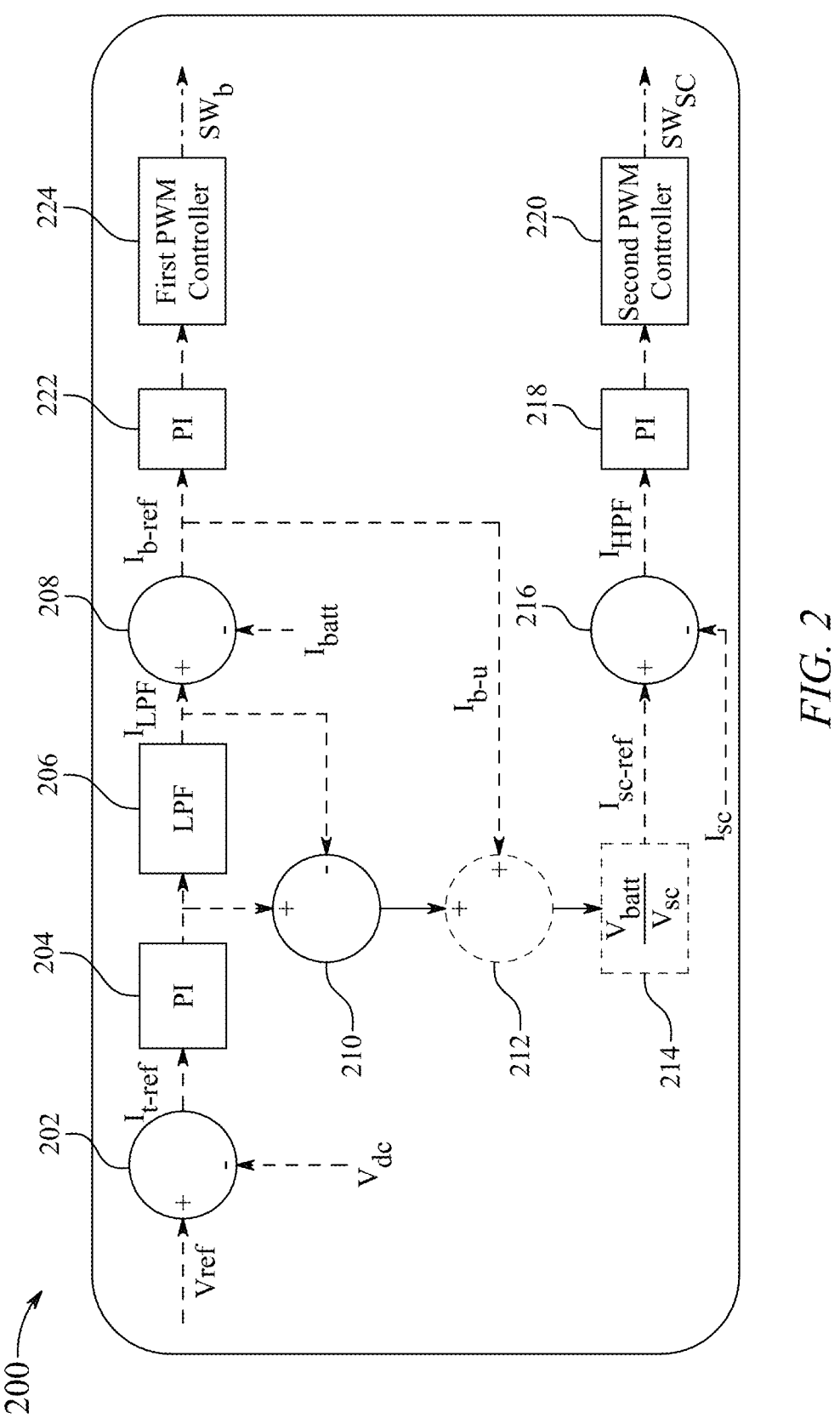
FIG. 2 illustrates a conventional low-pass-filter (LPF) based power allocation between a battery energy storage system (BESS) and a super-capacitor storage system (SCSS)

FIG. 2 illustrates a conventional low-pass-filter (LPF) based power allocation 200 between the BESS 116 and the SCSS 112. During the LPF based power allocation 200, an adder 202 is configured to receive a DC link voltage ($V_{dc}$) and a reference voltage ($V_{ref}$). In an aspect, the DC link voltage ($V_{dc}$) is received from the RES and the reference voltage ($V_{ref}$) is fetched from the memory, coupled with the adder. The received DC link voltage ($V_{dc}$) is compared with the reference voltage ($V_{ref}$) and generates a total error signal ($I_{t-ref}$). A proportional integral (PI) controller 204 is commutatively connected to the adder 202 and receives the total error signal ($I_{t-ref}$). The PI controller 204 generates an integral signal representing a modified current. A low pass filter (LPF) 206 is commutatively connected to the PI controller 204 and receives the integral signal. The LPF 206 is configured to generate a low power frequency $I_{LFC}$ current. The generated current requirement (demand by the loads) is separated into two components: an average component ($I_{bref}$) and a dynamic component ($I_{sref}$) using the LPF 206. The $I_{bref}$ and $I_{sref}$ serve as the current reference for the BESS and the SCSS, respectively. An adder 208 is configured to receive $I_{LFC}$ current from the LPF 206 and an actual BESS current ($I_{batt}$) from the BESS. The adder 208 generates a reference current ($I_{b-ref}$) for BESS. Due to the slow dynamic response of the BESS, the actual BESS current ($I_{batt}$) may not instantly coordinate with the reference current $I_{b-ref}$ which results in a fraction of power that remains uncompensated, and an uncompensated current ($I_{b-u}$) is generated by the adder 208. A PI controller 222 is configured to receive reference current ($I_{b-ref}$) and based on the reference current ($I_{b-ref}$), the PI controller 222 generates a duty ratio. A second PWM controller 224 is configured to receive the duty ratio from the PI controller 222 and to perform a required switching through a switch $SW_b$ corresponding to the received duty ratio from the PI controller 222.

As shown in FIG. 2, an adder 210 is configured to receive the integral signal from the PI controller 204 and the $I_{LFC}$ current from the LPF 206 simultaneously. An adder 212 is configured to receive the uncompensated current ($I_{b-u}$) generated by the adder 208. Using an analyzing unit 214, a reference current for SCSS ($I_{SC-ref}$) is formulated by dividing the battery voltage ($V_{batt}$) by the voltage of the supercapacitors ($V_{sc}$). An adder 216 is configured to receive the reference current for SCSS ($I_{SC-ref}$) from the analyzing unit 214 and compare it with an actual SCSS current ($I_{SC}$) received from the SCSS. In comparison, the adder 216 generates a high power frequency current ($I_{HPF}$). The PI controller 218 is configured to receive the high power frequency current ($I_{HPF}$) from the adder 216. Based on the high power frequency current ($I_{HPF}$), the PI controller 218 generates a duty ratio. A first PWM controller 220 is configured to receive the duty ratio from the PI controller 218. The first PWM controller 220 performs a required switching through a switch $SW_{sc}$ corresponding to the generated duty ratio by the PI controller 218.

In an operative aspect, the conventional LPF based power allocation 200 includes a step of dividing the disturbances, due to the variation between demand and power generation, into the high frequency power component ($I_{HFC}$) and the low frequency power component ($I_{LFC}$). The division is based on the total error signal ($I_{t-ref}$) which is generated at the DC bus terminal by comparing the deviation of the DC link voltage ($V_{dc}$) and the desired reference voltage ($V_{ref}$). The power filtration is performed based on:

$$\tau_{lpf}(s) = \frac{2\pi f_{lpf}}{s + 2\pi f_{lpf}}, \tag{1}$$

where $f_{lpf}$ is a filter cut-off frequency that can be calculated with numerous different methods for example, a function of sampling frequency ($f_s$) of RES, iterative examinations, or Ragone plots.

$$I_{LFC} = \tau_{lpf}(I_{t-ref}). \tag{2}$$

$$I_{HFC} = I_{t-ref} - I_{LFC}. \tag{3}$$

The low frequency component $I_{LFC}$ provides the reference current of BESS 116. The low frequency component $I_{LFC}$ is compared with the actual BESS current ($I_{batt}$). Accordingly, the PWM controller 224 provides the required switching through $SW_b$ corresponding to the duty ratios generated by the PI controller 222. Similarly, the reference current for SCSS ($I_{SC-ref}$) is formulated by dividing the battery voltage ($V_{batt}$) by the voltage of the supercapacitors ($V_{sc}$). The adder 216 receives the reference current for SCSS ($I_{SC-ref}$). The PI controller receives the reference current ($I_{b-ref}$) and, based on the reference current ($I_{b-ref}$), the PI controller 222 generates a duty ratio. The reference current ($I_{b-ref}$) can be expressed as:

$$I_{b-ref} = I_{LFC}. \tag{4}$$

Due to the slow dynamic response of the BESS, $I_{batt}$ may not instantly coordinate with $I_{b-ref}$, resulting in a fraction of power remaining uncompensated ($I_{b-u}$). This requires an additional power sharing ratio between BESS and SCSS is needed and additional voltage sensing devices. Therefore, the complexity of the conventional LPF based power allocation 200 is increased and requires formulation and design of an optimal power sharing technique that optimally switches the SCSS to limit its operation to facilitate power compensation (short-term transient variation) rather than energy compensation (long-term average variation) in the microgrid.

Figure 3:
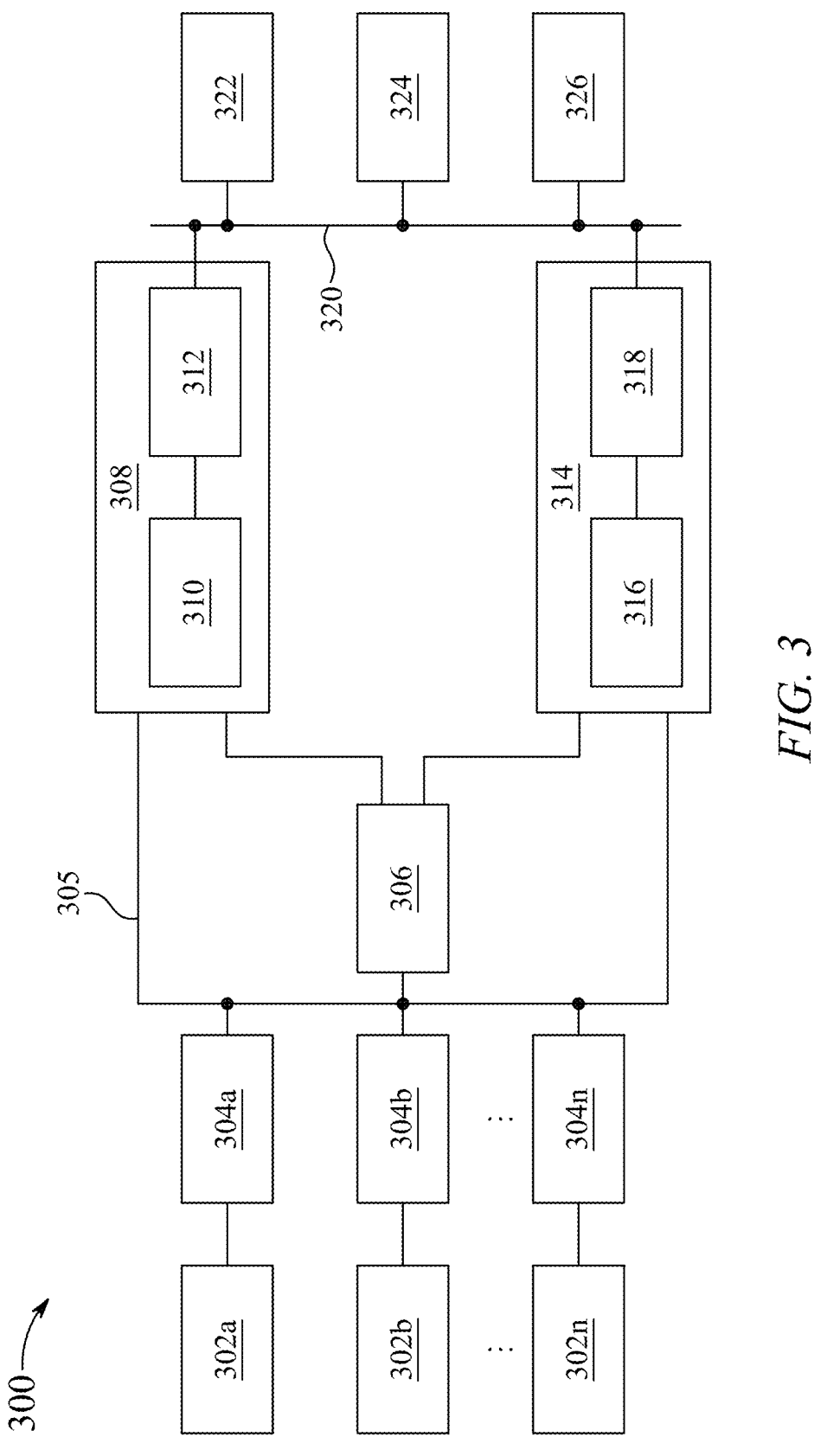
FIG. 3 illustrates a block diagram of the HESS for power management of a microgrid, according to aspects of the present disclosure.

FIG. 3 illustrates a block diagram of a hybrid energy storage system (HESS) 300 for power management of a microgrid (hereinafter interchangeably referred to as "the HESS 300"), according to aspects of the present disclosure.

Referring to FIG. 3, the HESS 300 includes a plurality of renewable energy sources (RES) 302a, 302b, . . . , 302n, a plurality of power converters 304a, 304b, . . . , 304n, a DC bus 305, a power management controller 306, a BESS 308, and a SCSS 314.

The plurality of RES 302a, 302b, . . . , 302n is located within the microgrid. Each RES is configured to generate a current $I_{RES}$. For example, each of the plurality of RES 302a, 302b, . . . , 302n refers to a device for generating power using a renewable energy source, such as sunlight, solar heat, wind power, geothermal heat, bioenergy, or hydrogen. Each of the plurality of RES 302a, 302b, . . . , 302n RES is connected to one of the plurality of power converters 304a, 304b, . . . , 304n. Each of plurality of power converters 304a,

304b, . . . , 304n receives the current $I_{RES}$ from each of the plurality of RES 302a, 302b, . . . , 302n, respectively. Each power converter 304 is configured to generate a DC voltage $V_{dc}$. The power converter 304 for each RES is connected in parallel to the point of common coupling of DC bus 305.

The DC bus 305 is connected to the plurality of power converters 304a, 304b, . . . , 304n. The DC bus 305 receives the generated DC voltage $V_{dc}$ from the plurality of power converters 304a, 304b, . . . , 304n.

Figure 4:
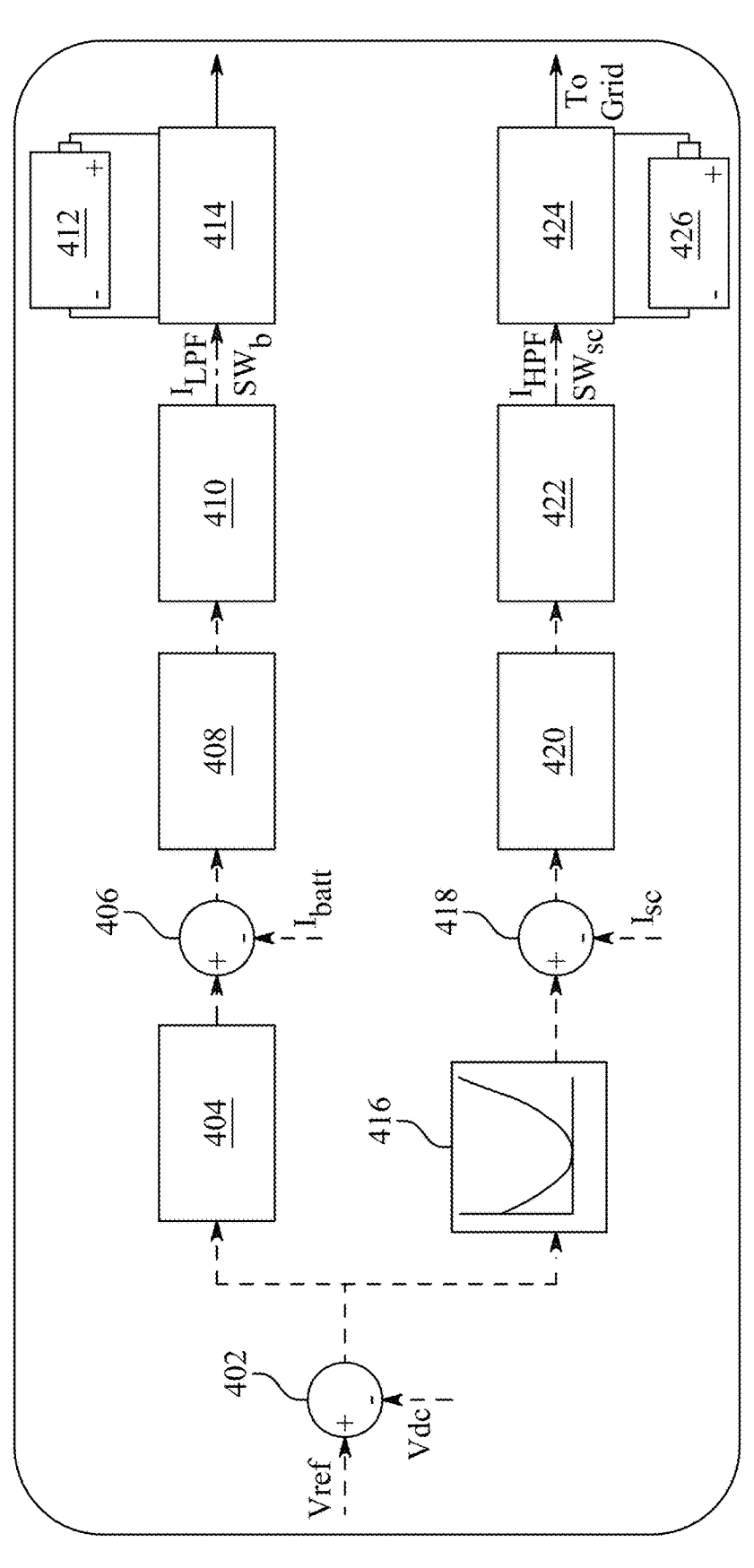
FIG. 4 represents a block diagram of a power management controller, according to aspects of the present disclosure.

The BESS 308 includes a battery 310 and a first bidirectional converter 312. The battery 310 is connected to the DC bus 305 and receives the DC voltage $V_{dc}$. The battery 310 generates a battery current $I_{batt}$. The first bidirectional converter 312 is connected across a positive terminal and a negative terminal of the battery 310 (as shown in FIG. 4). The first bidirectional converter 312 is configured to receive the low power frequency current $I_{LPF}$. The first bidirectional converter 312 is configured to charge the battery 310 with the low power frequency current $I_{LPF}$.

The SCSS 314 includes a supercapacitor 316 and a second bidirectional converter 318. The supercapacitor 316 is connected to the DC bus 305 and receives the DC voltage $V_{dc}$. The supercapacitor 316 generates a supercapacitor current $I_{SC}$. The second bidirectional converter 318 is connected across a positive terminal and a negative terminal of the SCSS 314 (as shown in FIG. 4). The second bidirectional converter 318 is configured to receive the high power frequency current $I_{HPF}$. The second bidirectional converter 318 is configured to charge the supercapacitor 316 with the high power frequency current $I_{HPF}$.

In an aspect, the HESS 300 includes a point of common contact (PCC) 320. The PCC 320 is configured to connect the HESS 300 to any of an AC load 322, a DC load 324, and a utility grid 326. The first bidirectional converter 312 is connected to the PCC 320 and is configured to supply DC current and DC voltage from the battery 310 to the PCC 320. The second bidirectional converter 318 is connected to the PCC 320 and is configured to supply AC current and AC voltage to the PCC 320.

The power management controller 306 is coupled to the BESS 308 and the SCSS 314. The power management controller 306 is configured to control the functioning of the BESS 308 and the SCSS 314. According to an aspect of the present disclosure, the power management controller 306 may be implemented as one or more microprocessors, microcomputers, digital signal processors, central processing units, state machines, logic circuitries, and/or any devices that manipulate signals based on operational instructions. Among other capabilities, the power management controller 306 may be configured to fetch and execute computer-readable instructions stored in a memory. The memory may be coupled to the power management controller 306 and may include any computer-readable medium known in the art including, for example, volatile memory, such as static random access memory (SRAM) and dynamic random access memory (DRAM) and/or nonvolatile memory, such as read only memory (ROM), erasable programmable ROM, flash memories, hard disks, optical disks, and magnetic tapes.

FIG. 4 represents a block diagram of a power management controller 400, according to aspects of the present disclosure. As shown in FIG. 4, the power management controller 400 includes a first adder 402, a voltage controller 404, a second adder 406, a current controller 408, a first PWM controller 410, a battery switch $SW_b$, a battery 412, a first bidirectional converter 414, a look up table LUT controller 416, a third adder 418, a PI controller 420, a second PWM controller 422, a supercapacitor switch SW$_{SC}$, a second bidirectional converter 424, and a supercapacitor 426.

The first adder 402 is configured to receive the DC voltage V$_{dc}$ from the DC bus 305 and to subtract the DC voltage V$_{dc}$ from a voltage reference V$_{ref}$. The first adder 402 generates a voltage error signal.

The voltage controller 404 is connected to the first adder 402 and receives the voltage error signal from the first adder 402. The voltage controller 404 generates a gain modified battery current. In an example, the voltage controller is a type II voltage compensator. The voltage controller 404 is configured to adjust the gain of the DC voltage V$_{dc}$ to match a desired gain v. In an aspect, the voltage controller 404 is configured to adjust the gain of the DC voltage V$_{dc}$ to match the desired gain v by converting the voltage error signal to a frequency domain having a frequency s, identify poles w$_z$ and w$_p$ in the voltage error signal in the frequency domain, and restrict a transfer function H$_T$(s) of the voltage controller 404 to:

$$H_T(s) = v\left(\frac{1 + \dfrac{w_z}{s}}{1 + \dfrac{s}{w_p}}\right).$$

The second adder 406 is connected to the voltage controller 404 and receives the gain modified battery current. The second adder 406 is configured to subtract the battery current I$_{batt}$ from the gain modified battery current and generate a battery current error signal.

The current controller 408 is connected to the second adder 406 and receives the battery current error signal. The current controller 408 is configured to compensate a phase difference between the battery current I$_{batt}$ and the battery current error signal, and generate a phase and gain compensated battery current error signal. In an example, the current controller 408 is a type II current compensator. The current controller 408 is configured to compensate the phase difference between the battery current I$_{batt}$ and the battery current error signal. The current controller 408 is configured to compensate the phase difference between the battery current I$_{batt}$ and the battery current error signal by boosting the phase such that:

$$f_p = \tan\left(\frac{\text{phase boost}}{2} + \frac{\pi}{4}\right)f_c,$$

$$f_z = \frac{f_c}{\tan\left(\dfrac{\text{phase boost}}{2} + \dfrac{\pi}{4}\right)},$$

where f$_c$ is a zero crossover frequency of the poles.

The first pulse width modulator (PWM) controller 410 is connected to the current controller 408 and receives the phase and gain compensated battery current error signal. The first PWM controller 410 is configured to generate a low power frequency current I$_{LPF}$ from the phase and gain compensated battery current error signal.

The battery switch SW$_b$ is connected to the first PWM controller 410. The first PWM controller 410 is configured to actuate the battery switch SW$_b$ by transmitting the low power frequency current I$_{LPF}$ to the first bidirectional converter 414. The first bidirectional converter 414 is configured to charge the battery 412 with the low power frequency current, I$_{LPF}$.

The LUT controller 416 is connected to the first adder 402. The LUT controller 416 is configured to receive the voltage error signal from the first adder 402, and to match the voltage error signal to a corresponding supercapacitor current error signal. Based on the matched result, the LUT controller 416 generates a LUT current error signal.

The third adder 418 is connected to the LUT controller 416. The third adder 418 is configured to receive a supercapacitor current I$_{SC}$. The third adder 418 is configured to subtract the supercapacitor current I$_{SC}$, from the LUT current error signal and generate a supercapacitor current error signal.

The PI controller 420 is connected to the third adder 418. The PI controller 420 is configured to receive the supercapacitor current error signal from the third adder 418. Based on the received supercapacitor current error signal, the PI controller 420 is configured to correct the supercapacitor current, I$_{SC}$, and generate a corrected supercapacitor current.

The second PWM controller 422 is connected to the PI controller 420. The second PWM controller 422 is configured to receive the corrected supercapacitor current and generate a high power frequency current I$_{HPF}$.

The supercapacitor switch SW$_{sc}$, is connected to the second PWM controller 422. The second PWM controller 422 is configured to actuate the supercapacitor switch SW$_b$, to transmit the high power frequency current I$_{HPF}$, to the second bidirectional converter 424. The second bidirectional converter 424 is configured to charge the supercapacitor 426 with the high power frequency current I$_{HPF}$.

In an operative aspect, the BESS is a dispatchable energy source that can be charged or discharged with the grid requirements in terms of excess/deficit power. The BESS is controlled with an outer voltage control loop and an inner current control loop and hence operated in a voltage controlled mode for DC bus voltage regulation, as shown in FIG. 4.

For obtaining a suitable BESS response towards the voltage regulation, the technical power density limitations of BESS are considered. In an example, the type II controller is employed for a voltage feedback loop and a current feedback loop. The Type II controller is a type of lead compensator that facilitates an enhanced and a robust performance for the microgrid regulation operations. The combination of poles and zeroes provides an appropriate shaping of the control loops. The appropriate shaping of the control loops is achieved through modification of the phase and gain characteristics of an open-loop frequency response. For example, by providing compensation from 0° up to 90°, a zero steady state error can be achieved with faster response and nominal overshoot through appropriate tuning. The controller transfer function, magnitude transfer function and argument are given in equations (5)-(7) as:

$$H_T(s) = \frac{\left(1 + \dfrac{s}{w_z}\right)}{\left(\dfrac{s}{w_{po}}\right)\left(1 + \dfrac{s}{w_p}\right)} \tag{5}$$

$$= \frac{w_{po}}{w_z}\left(\frac{1 + \dfrac{w_z}{s}}{1 + \dfrac{s}{w_p}}\right)$$

$$= v\left(\frac{1 + \dfrac{w_z}{s}}{1 + \dfrac{s}{w_p}}\right),$$

-continued $$H_T(jw) = \frac{\left|1 + \frac{jw}{w_z}\right|}{\left|\frac{jw}{w_{po}}\right|\left|1 + \frac{jw}{w_p}\right|}, \tag{6}$$

$$\arg H_T(jw) = \tan^{-1}\left(\frac{w}{w_z}\right) - \tan^{-1}\left(\frac{w}{w_p}\right) - \frac{\pi}{2}, \tag{7}$$

where, $w_z$ and $w_p$ are the poles and zeros of the controller in the frequency domain, respectively and v is the required value of the gain. In an example, a k-factor calculation is used to design these controllers (current controller, and volltage controller). The k-factor calculation is a mathematical tool which is configured to perform stability analysis and synthesis. The k-factor calculation forces the power management controller 400 to have a desired output based on loop cross-over frequency and phase margin, based on the equations (8)-(10) given as:

$$k = \tan\left(\frac{\text{phase boost}}{2} + \frac{\pi}{4}\right), \tag{8}$$

$$f_p = k \cdot f_c = \tan\left(\frac{\text{phase boost}}{2} + \frac{\pi}{4}\right)f_c, \tag{9}$$

$$f_z = \frac{f_c}{k} = \frac{f_c}{\tan\left(\frac{\text{phase boost}}{2} + \frac{\pi}{4}\right)}. \tag{10}$$

Therefore, the stability and response of the BESS is obtained by designing the voltage and current control loops using the k-factor approach. A low bandwidth is considered in designing these controllers (voltage controller and the current controller), correlative to the slow dynamic response of BESS during generation and or load variations. Therefore, the BESS compensates the average long-term power demand of the system with a smooth transition and thus contributes to the prolonged life of the BESS due to reduction in the current level.

Figure 5:
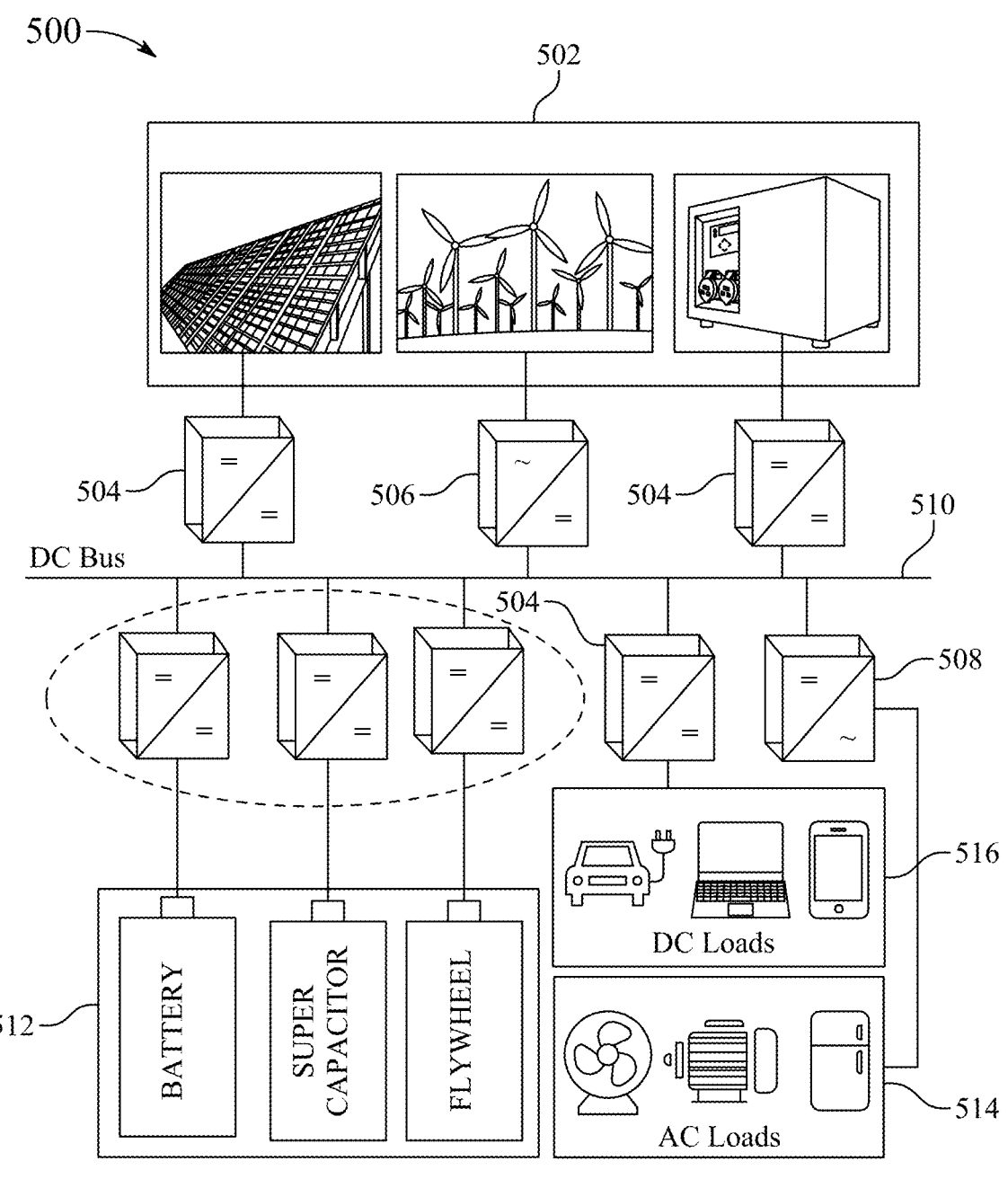
FIG. 5 represents an architecture of a conventional direct current (DC) microgrid.

FIG. 5 represents an architecture of a conventional direct current (DC) microgrid 500. The conventional DC microgrid 500 is a power distribution system including several components, such as a plurality of interconnected dc power sources, dc-dc converter(s), dc load(s), and/or ac load(s) powered by dc-ac inverter(s). The DC microgrid 500 is not directly connected to an ac primary source of electricity, however the DC microgrid 500 is interconnected with other DC microgrids via one or more dc-ac bidirectional converters or DC-AC inverters.

As shown in FIG. 5, the DC microgrid 500 includes a plurality of renewable energy sources (RES) 502, a plurality of DC-DC converters 504, an AC-DC converter 506, a DC-AC converter 508, a DC bus 510, an energy storage system (ESS) 512, a plurality of AC loads 514 and a plurality of DC loads 516.

Each RES 502 is configured to generate the current $I_{RES}$. For example, each RES of the plurality of RES 502 refers to a device for generating power using a renewable energy source, such as sunlight, solar heat, wind power, geothermal heat, bioenergy, or hydrogen.

The ESS 512 is configured to store electricity generated by the RES 502. In an aspect, the ESS 512 includes renewable batteries, flywheels, fuel cells, supercapacitors, etc.

Each of the plurality of power converters (the plurality of DC-DC converters 504, and the AC-DC converter 506) is connected to one of the plurality of RES 502. Each of the plurality of power converters receives the current $I_{RES}$ from the RES 502 and generates DC voltage $V_{dc}$.

The DC bus 510 is connected to the plurality of power converters (the DC-DC converter 504, the AC-DC converter 506, and the DC-AC converter 508) and receives DC voltage $V_{dc}$. The plurality of DC-DC converters 504 converts the DC voltage $V_{dc}$ received from the DC bus 510, from one voltage level to another level. The AC-DC converter 506 is configured to convert an alternating current (AC) into the DC. The DC-AC converter 508 converts the DC into the AC for use by the plurality of AC loads 514.

The plurality of AC loads 514 is connected to the PCC (not shown) via a bidirectional converter. The bidirectional converter is configured to supply AC current and AC voltage to the PCC. The plurality of DC loads 516 is connected to the PCC via the bidirectional converter. The bidirectional converter is configured to supply DC current and DC voltage from the battery to the PCC.

In an operative aspect, at the interval of surplus or deficient power from the RES 502, each ESS 512 charges or discharges respectively to mediate the power mismatch. The ESS 512 is interfaced to the DC microgrid 500 at the PCC with power generating sources. The RES 502, such as PV and wind turbine generators in a renewable grid are interfaced to the PCC of the microgrid through unidirectional power converters. The RES 502 accommodates the load requirements and charges the ESS 512.

Figure 6:
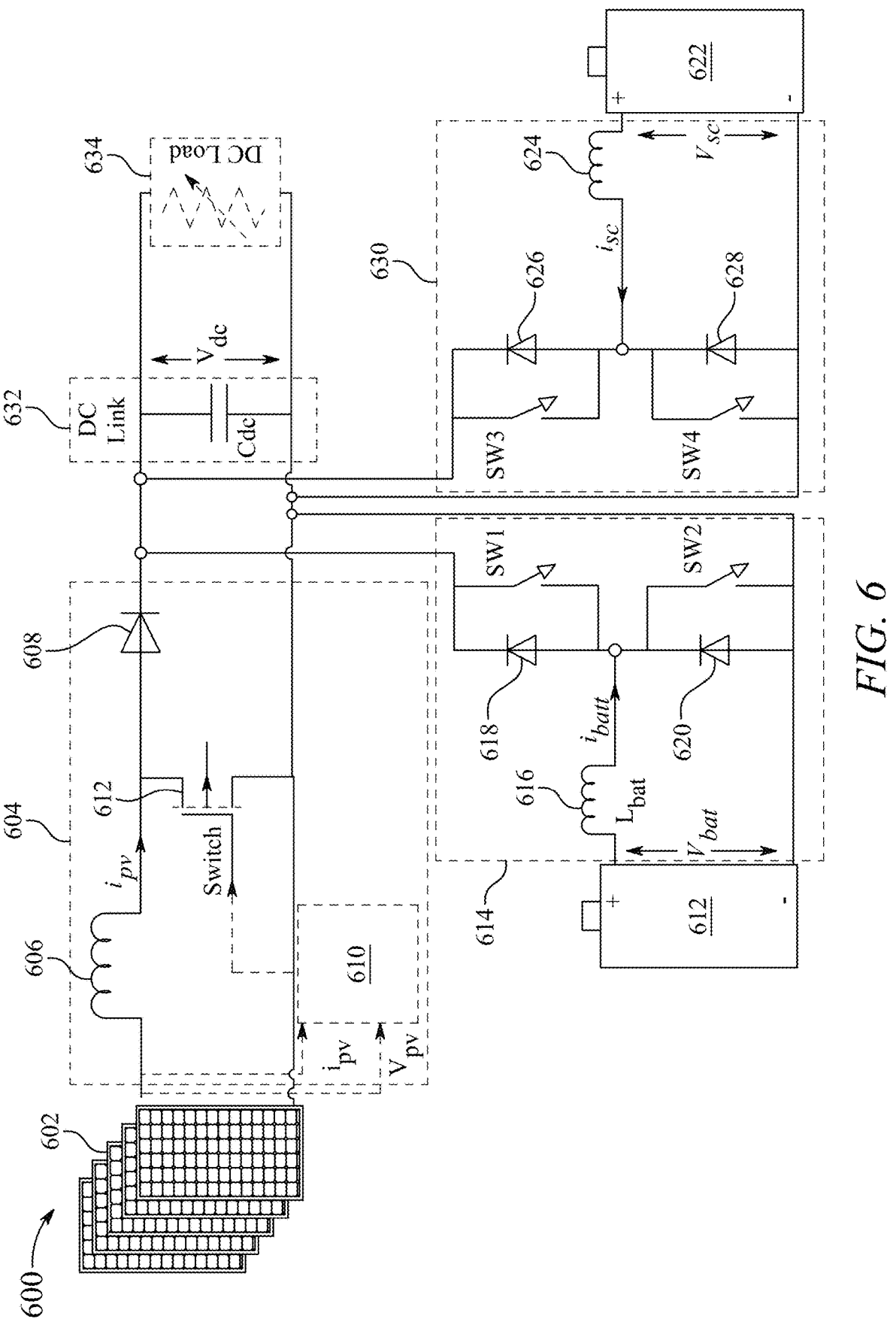
FIG. 6 represents a circuit diagram of a microgrid having the power management controller, according to aspects of the present disclosure.

FIG. 6 represents a circuit diagram of a microgrid 600 having the power management controller 400 used with photovoltaic arrays 602, according to aspects of the present disclosure. However, the microgrid 600 is not limited to only photovoltaic arrays and may include other renewable energy sources such as a wind turbine (see 105, FIG. 1), fuel cells, a hydro-generator and biomass.

In the example of FIG. 6, the microgrid 600 includes the photovoltaic array 602, a boost converter 604, a battery 612, a first bidirectional converter 614, a supercapacitor 622, a second bidirectional converter 630, a DC-DC converter 632, and a DC load 634.

The microgrid 600 includes a photovoltaic array 602 which is configured to receive solar light and generate electric energy. In an aspect, the photovoltaic array 602 is coupled to an AC-DC voltage converter that is configured to generate a DC current.

The boost converter 604 is electrically coupled with the photovoltaic array 602 and receives the generated DC current. The boost converter 604 is configured to boost the DC current to a higher voltage that improves an efficient transfer of the DC power to the DC load 634. The boost converter 604 includes an inductor 606 coupled to a diode 608 and a switch. For example, the switch may be GaN HEMTs, Si or SiC MOSFETs, IGBTs, MCTs, Thyristors, GTOs, or IGCTs. In an example, the diode 608 may be replaced with another switch to allow for bi-directional operation.

In an aspect, the boost converter 604 includes the MPPT algorithm 610 which is configured to continuously adjust the impedance of the photovoltaic array 602 to keep the photovoltaic array 602 operating at, or close to, the peak power point of the photovoltaic array 602 under varying conditions, such as changing solar irradiance, temperature, and load. The MPPT algorithm 610 controls the voltage to ensure that the system operates at "maximum power point" (or peak voltage) on a power voltage curve.

The battery 612 is connected to receive the DC voltage $V_{dc}$ and generate a battery current $i_{batt}$. The first bidirectional converter 614 is connected across the positive terminal and the negative terminal of the battery. The first bidirectional converter 614 includes an inductor 616, two diodes 618, 620, and two switches SW1, SW2.

The supercapacitor 622 is connected to receive the DC voltage $V_{dc}$ and generate a supercapacitor current $i_{SC}$. The second bidirectional converter 630 is connected across the positive terminal and the negative terminal of the supercapacitor 622. The second bidirectional converter 630 includes an inductor 624, two diodes 626, 628, and two switches SW3, SW4.

The DC-DC converter 632 includes a capacitor $C_{dc}$ that is configured to generate a constant DC voltage $V_{dc}$ as an output. The DC load 634 is configured to receive the constant DC voltage $V_{dc}$ from the DC-DC converter 632. In an aspect, the DC load 634 may be a varying load.

Figure 7:
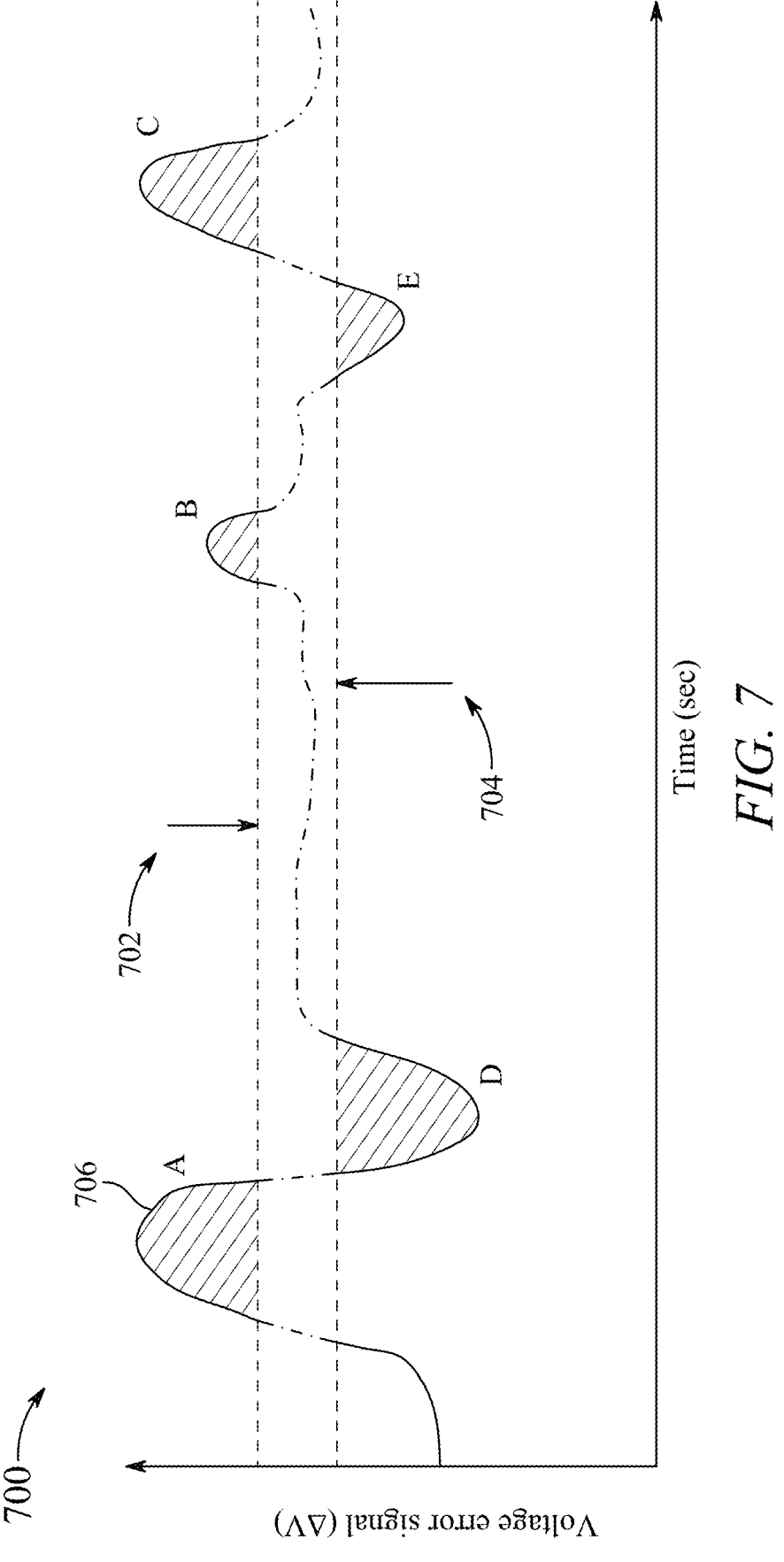
FIG. 7 is an exemplary graph illustrating an allocation of power between the BESS and the SCSS based on voltage deviation at a DC bus, according to aspects of the present disclosure.

FIG. 7 is an exemplary graph 700 illustrating an allocation of power between the BESS and the SCSS based on voltage deviation at the DC bus, according to aspects of the present disclosure. As shown in FIG. 7, a boundary region, shown between points 702 and 704, indicates an instantaneous discharging of the SCSS and supplying the deficient power requirement.

By employing the power management controller, the BESS is configured to provide a constant steady state voltage support to the DC bus (as shown by curve 706 in FIG. 7). The operation of SCSS can be controlled to provide a desired operational characteristic. Firstly, considering low energy density of SCSS, their operation during steady state voltage deviation negatively affects lifespan and technological significance of the SCSS. Therefore, SCSS operation should rapidly acquire zero value when the bus voltage has been reduced from a transient to a steady state requirement as depicted in FIG. 7. Secondly, a fast dynamic response is needed for abrupt power variations.

The SCSS is implemented to support the microgrid during abrupt load/generation changes and compensate for the transient modes. When a new load is introduced, the microgrid experiences a sudden load increment and as a result, a sudden voltage dip occurs at the DC bus and vice versa. This voltage variation severely deteriorates the stability of the microgrid. To establish a non-linear function for SCSS operation, the power management controller 400 as shown in FIG. 4, is employed. The main objective of the power management controller is the identification of two tolerable boundaries, a lower boundary and an upper boundary of the DC bus voltage as shown in FIG. 7. The line 702 indicates the lower boundary of the DC bus voltage. The line 704 indicates the upper boundary of the DC bus voltage. It is required that the SCSS lies within the stable DC condition within the lower and upper boundaries.

Based on the observations of the generated error signals by $V_{ref}$ and $V_{dc}$ at the DC bus, the power management controller is set to operationally drive the SCSS towards regulating the undervoltage and over-voltage conditions, hence limiting its power absorption and injection, respectively. The power management controller defines the lower and upper boundary limits correspondingly. In this way, the operation of the SCSS is limited to surge conditions and would not operate within the steady state region, which is compensated by the BESS.

Further, during the dynamic load changing process, the SCSS is charged in regions A, B and C to regulate the voltage below the upper boundary region and absorb the redundant energy. Similarly, in regions D and E, voltage is regulated above the lower boundary region by instantaneous discharging of SCSS and supplying the deficient power requirement. Additionally, the power management controller ensures restriction of power transition during steady state errors through required suitable model based regression techniques.

A discussion of the modelling and configuration of PV power generation system by employing the power management controller follows.

As known in the art, a PV cell module can be represented as an electrical equivalent of single diode-five parameter circuit, primarily due to its sufficient accuracy and simplified resilience to fit experimental data. In lieu, adoption of a double diode seven parameter model is inherently complicated without any considerable gain in accuracy. In another conventional art, a Gompertz function is employed the for PV representation. The Gompertz function is a sigmoid function which describes growth as being slowest at the start and end of a given time period.

The single-diode five parameter model includes a photocurrent source with a series resistance, a shunt resistance and a diode. Further, the generated photocurrent, $I_{ph}$, ideality factor of the diode, $\mu$, shunt resistance, $R_{sh}$, series resistance, $R_s$ and the saturation current, $I_{sat}$ are the five parametric estimation values of the model. Albeit for simplicity, some studies neglect $R_p$ or both $R_p$ and $R_s$.

The implicit and explicit form of the equation are as follows:

$$I_{pv} = I_{ph} - I_{sat}\left[\exp\left(\frac{V_{pv} + R_s I_{pv}}{\mu V_{th}}\right) - 1\right] - \frac{V_{pv} + R_s I_{pv}}{R_{sh}}, \tag{11}$$

$$V_{th} = \frac{n_s k_B T}{q}, \tag{12}$$

where $V_{th}$ is an array thermal voltage represented with its relation to $\mu$, series connected cells ($n_s$), Boltzmann constant ($k_B$), electron charge (q) and the p-n junction temperature of the diode (T). The $\mu$ range is selected as $1 \leq \mu \leq 1.5$. The relationship of the generated photocurrent to the PV cell current and the solar irradiance is represented as:

$$I_{ph} = (I_{ph,n} + I_{tsh}\Delta T)\frac{\Psi}{\Psi_n}, \tag{13}$$

where $I_{ph,n}$ implies the photocurrent at standard test conditions (i.e. 25° C. and 1000 W/m²); $I_{tsh}$ is the current/temperature coefficient; $\Delta T$, in Kelvin, is the difference between the actual temperature and the nominal temperature; $\Psi$ and $\Psi_n$ are the irradiation on the device and the nominal irradiation, respectively in W/m². Furthermore, $I_{ph,n}$ can be calculated by (14) given by:

$$I_{pv,n} = \frac{R_{sh} + R_s}{R_{sh}} I_{sat}. \tag{14}$$

The standard parameters of the structured PV panel are shown in Table 1 that is utilized to obtain the I-V characteristics for varying irradiance with constant temperature and varying temperature with a constant irradiance, and the corresponding values are utilized for proving the validity of the design model in accordance with the standardized design.

Further, with the perturbation of the operating voltage to ensure maximum power, the perturb and observe method for maximum power point tracking (MPPT) is integrated to the PCC of the DC microgrid through the boost converter.

TABLE 1

| PV panel parameters at standard condition | |
|---|---|
| Description | Value |
| Power at maximum power point ($P_{MPP}$) | 200 W(−5%\+10%) |
| Voltage at maximum power point ($V_{MPP}$) | 26.30 V |
| Current at maximum power point ($I_{MPP}$) | 7.61 A |
| Open circuit voltage ($V_{OC}$) | 32.90 V |
| Short circuit current ($I_{SC}$) | 8.21 A |

A discussion of the modelling and configuration of the BESS by employing the power management controller follows.

Figure 8:
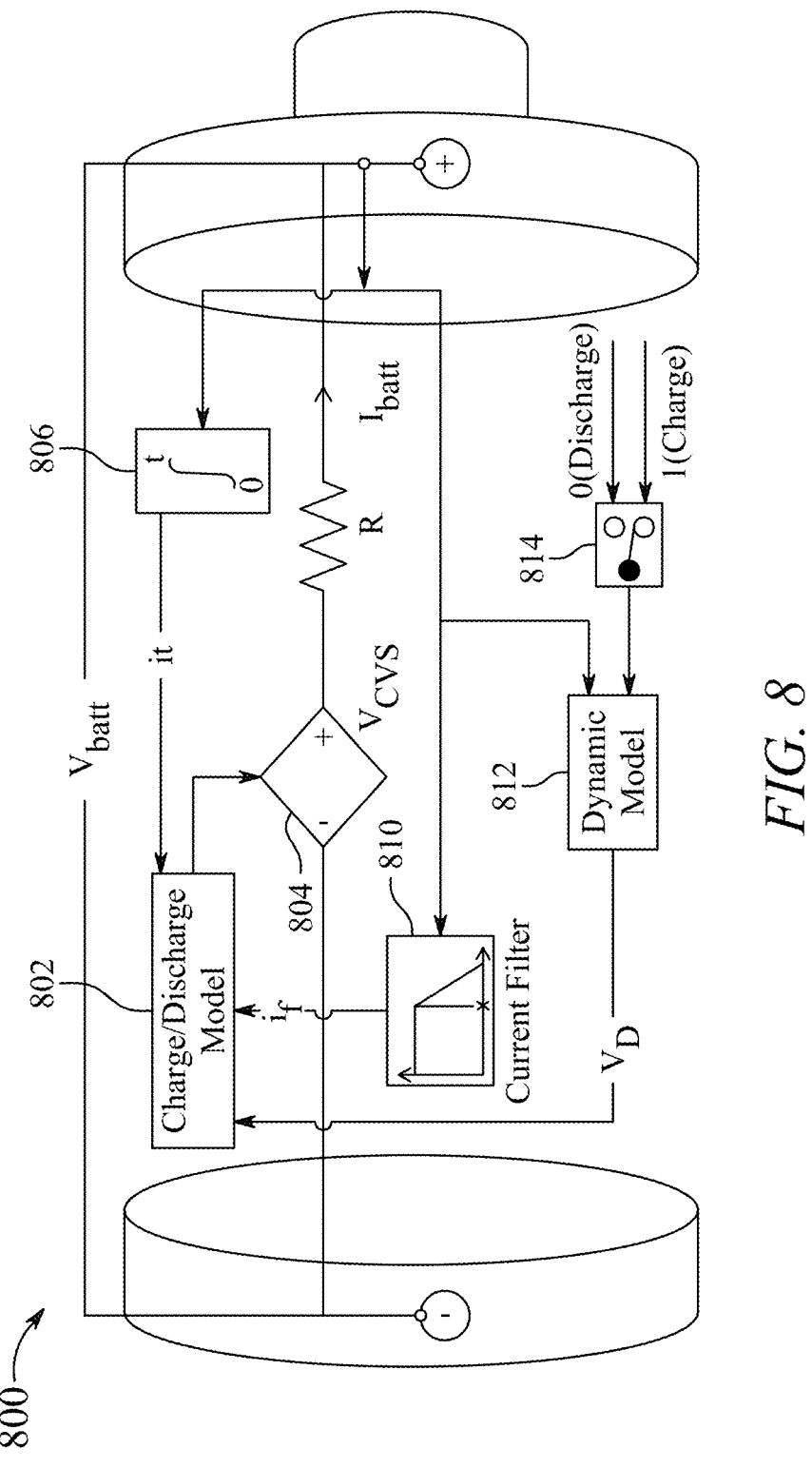
FIG. 8 represents a circuit model of a lead-acid (PbAc)-BESS, according to aspects of the present disclosure.

FIG. 8 represents a circuit diagram of a lead-acid (PbAc)-BESS 800, according to aspects of the present disclosure. As shown in FIG. 8, the PbAc-BESS 800 includes a charge/discharge model 802, a controlled voltage source 804, an integrator 806, a resistor 808, a current filter 810, a dynamic model 812, and a switch 814. The PbAc-BESS 800 represents the operation of BESS voltage ($V_{batt}$), consisting of a controlled voltage source ($V_{cvs}$), an internal resistance ($R_b$), the charge and discharge model, and a non-linear dynamic design of BESS based on its hysteresis phenomenon.

The battery voltage is calculated as given in (15) considering the polarization constant ($\rho_b$), the exponential zone voltage ($\alpha$) and the exponential capacity ($\beta$).

$$V_{batt} = E_b - \frac{\rho_b \Gamma_b}{\Gamma_b - it} \cdot it - R \cdot i_{batt} + \alpha e^{(-\beta \cdot it)} - \frac{\rho_b \Gamma_b}{\Gamma_b - it} \cdot i_f. \tag{15}$$

where $\Gamma_D$ is the maximum capacity of the BESS and "it" represents the actual extracted BESS charge. The filtered current ($i_f$) exhibits a moderate voltage dynamics corresponding to a current step response. The moderate voltage dynamics also solves the problem associated with an algebraic loop that is required by the electrical systems. The algebraic loop occurs when an input port of a block is driven by an output of the same block, either directly, or by a feedback path.

$$R_p = \rho_b \frac{\Gamma_b}{it}. \tag{16}$$

The non-linear variation of the open circuit voltage of BESS with the SoC is modeled using the polarization resistance ($\rho_b$). The polarization resistance is designed according to equation (16). In the case of a fully charged BESS (i.e., it=0), the value of the polarization resistance cannot be considered. However, as per recent studies, a contribution of an evaluated polarization resistance is about 10% of the BESS capacity. Also, the rapid voltage increase as the BESS reaches full charge is also covered by the power management controller and is represented by equation (17).

$$R_p = \rho_b \frac{\Gamma_b}{it - 0.1 \cdot \Gamma_b}. \tag{17}$$

Irrespective of the SoC of the BESS, there exists a hysteresis phenomenon only in the exponential area between the SoC and the charge/discharge process. This hysteresis phenomenon is quantified using the dynamic model of the BESS based on equation (18).

$$\frac{V_D(s)}{B_M(s)} = \frac{\alpha}{1/(\beta \cdot i_{batt}(t) \cdot s + 1)}. \tag{18}$$

Inclusive of the formulated dynamic zone voltage ($V_D$) and the BESS charge/discharge mode ($B_M$), a model of charge and discharge characteristics is developed as given in equations (19)-(20).

$$V_{ch} = E_b - \rho_b \cdot \frac{\Gamma_b}{it + 0.1 + \Gamma_b} \cdot i_f - \rho_b \cdot \frac{\Gamma_b}{\Gamma_b - it} \cdot it + \mathcal{L}^{-1}\left[\frac{V_D(s)}{B_M(s)} \cdot \frac{1}{s}\right]. \tag{19}$$

$$V_{dch} = E_b - \rho_b \cdot \frac{\Gamma_b}{\Gamma_b - it} \cdot i_f - \rho_b \cdot \frac{\Gamma_b}{\Gamma_b - it} \cdot it + \mathcal{L}^{-1}\left[\frac{V_D(s)}{B_M(s)} \cdot 0\right]. \tag{20}$$

A discussion of the modelling and configuration of the SCSS by employing the power management controller follows.

Figure 9:
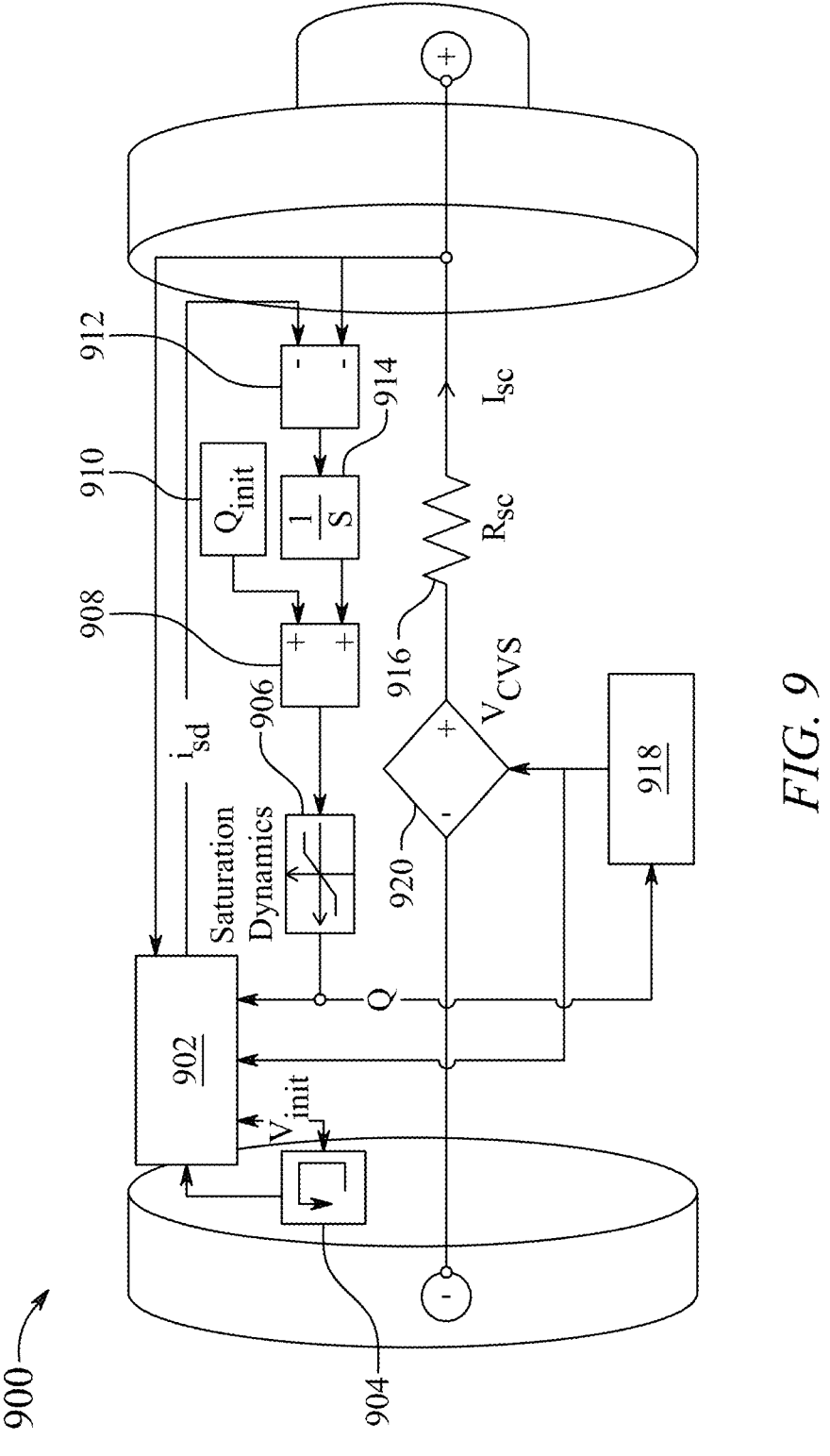
FIG. 9 represents a dynamic model of the SCSS, according to aspects of the present disclosure.

FIG. 9 represents a dynamic model of the SCSS 900, according to aspects of the present disclosure. The dynamic model of the SCSS 900 includes a Tafel unit 902, a memory 904, a saturation unit 906, an adder 908, a clock signal 910, an integrator 914, a subtractor 912, a resistor 916, a Stern equation calculator 918, and a controlled voltage source 920. The SCSS is an electrochemical capacitor which includes two electrodes allowing an application of potential across its cell; and double layers at each electrode-electrolyte interface. The Tafel unit 902 includes circuitry configured to employ a Tafel equation. The Tafel equation assumes that the concentrations at the electrode are practically equal to the concentrations in the bulk electrolyte, allowing the current to be expressed as a function of potential only.

The Stern equation calculator 918 includes circuitry configured to employ a Stern equation. The Stern equation governs the ion distribution, electrostatic potential and hydrodynamic flow field around a particle to allow for the lateral movement of ions within a Stern layer and a time-dependent particle surface charge density. In an aspect, the Stern equation explains the creation of bisections of ion allocation based on the binding of ions as inner section and outer sections termed as a compact layer (Stern layer) and diffuse layer, respectively. The Stern layer is composed of ions sturdily adhered on electrode whereas the diffuse layer contains continuous electrolytic ions distribution aided by thermal motion.

In the present disclosure, a non-linear Stern-Tafel mathematical model (also known as dynamic model 900) is employed that defines a relationship between current, voltage, and availability of charge during the charge/discharge process. In an aspect, the non-linear Stern-Tafel mathematical model is a combination of the Stern equation and the Tafel equation.

The terminal SCSS current ($I_{sc}$) is the input to the dynamic model of the SCSS 900 and the output includes the corresponding voltage ($V_{sc}$) and SoC value. The electric charge of SCSS ($\Gamma_{sc}$) is quantified by equation (21), using the initial charge amount ($\Gamma_{si}$), series current ($i_{sc}$) and the self-discharge current ($i_{sd}$).

$$\Gamma_{sc} = \Gamma_{si} + \int_0^T -(i(t) + i_{sd}(t))dt \tag{21}$$

The function of saturation limit helps to prevent over-charge or over-discharge by restricting the calculated amount of charge within a specified range.

The Tafel equation is used to generate a leakage current ($I_{sd}$) waveform of the SCSS. Based on the modified value of capacitance with the inclusion of the surface charge of ions and the charge density, an accurate ion alignment can be portrayed using the Stern equation 918. This improved capacitive summation is shown in equation (22).

$$\frac{1}{C} = \frac{1}{C_M} + \frac{1}{C_G}\left(1 + \frac{\delta\sigma_A}{\delta\sigma}\right). \tag{22}$$

For modelling the SCSS current, the voltage form derived is substituted into the Tafel equation (23), where F and G are the Faraday and ideal gas constant, respectively.

$$i_{sd}(t) = -A \cdot i_d \cdot N_L \cdot \exp\left\{\frac{C_T \cdot F}{G \cdot T_s} \cdot \left(\frac{V_{sc}}{N_s} - \frac{V_{smax}}{N_s} - \Delta V_s\right)\right\}. \tag{23}$$

Considering this additional improvement, the voltage form of the combined Stern-Tafel model is computed using equation (24).

$$V_{scv} = \frac{N_L \cdot N_s \cdot \Gamma_{sc} \cdot r_m}{N_p \cdot N_L^2 \cdot \epsilon_p \cdot A} + \frac{2 \cdot N_L \cdot N_s \cdot G \cdot T_s}{F} \cdot C_T \cdot r_m \cdot \sinh\left(\frac{\Gamma_{sc}}{N_p \cdot N_L^2 \cdot A\sqrt{8 \cdot G \cdot T_s \cdot \epsilon_p \cdot m_c}}\right) \tag{24}$$

The SCSS current is modeled with a curve obtained using equations (22)-(24). During the dynamic modelling of the SCSS 900, an exponent of the obtained curve can be changed by varying the ideal gas constant, temperature ratio and over-potential. Accordingly, using equation (22), an existing Gouy-Chapman model is further improved by considering the influence of the motion of the thermal ions on the capacitance. The Gouy-Chapman model is a modification of a Helmholtz model, considering the distribution of the charge to be continuous along a layer (diffuse layer) in electrolyte solution termed. The Gouy-Chapman model provides higher capacitance at the electrode's outer layer owing to the existence of ions near the electrode interface. However, the Gouy-Chapman model fails to provide a higher estimation of capacitance in an electric double layer capacitor due to inverse correlation of capacitance with separation distance. From these values, the rest of the parameters such as, ion alignment factor, model capacitance ($C_M$), thermal motion capacitance ($C_G$), molecular radius ($r_m$), molar concentration ($r_m$), material permittivity ($\epsilon_p$) operating temperature ($T_s$), over-potential ($\Delta V_s$), number of parallel and series SCSS cells ($N_p$, $N_s$) number of electrolyte layers of SCSS ($N_L$) and the interfacial area between the electrode-electrolyte (A) are used to define the combined Stern-Tafel model of SCSS.

A discussion of modelling the bi-directional DC-DC power converters by employing the power management controller follows:

Using small signal analysis, an open-loop transfer function of the bi-directional converter can be determined. The ratio of inductor current to duty cycle (25) and ratio of voltage output to duty ratio (26) are used for modelling:

$$G_{id} = \frac{\frac{V_{in}}{1-D}(2 + sR_L)}{(1-D)^2 R_L + sL + s^2 R_L C}, \tag{25}$$

$$G_{vd} = \frac{\frac{V_{in}}{R_L(1-D)^2}(R_L^2(1-D)^2 - sR_L)}{(1-D)^2 R_L + sL + s^2 R_L C} \tag{26}$$

where, $V_{in}$ is the input voltage, $R_L$ is the load resistance, C is the output capacitance of the converter, L is the inductance of the converter and D is the duty ratio of the bi-directional dc-dc power converter.

Figure 10A:
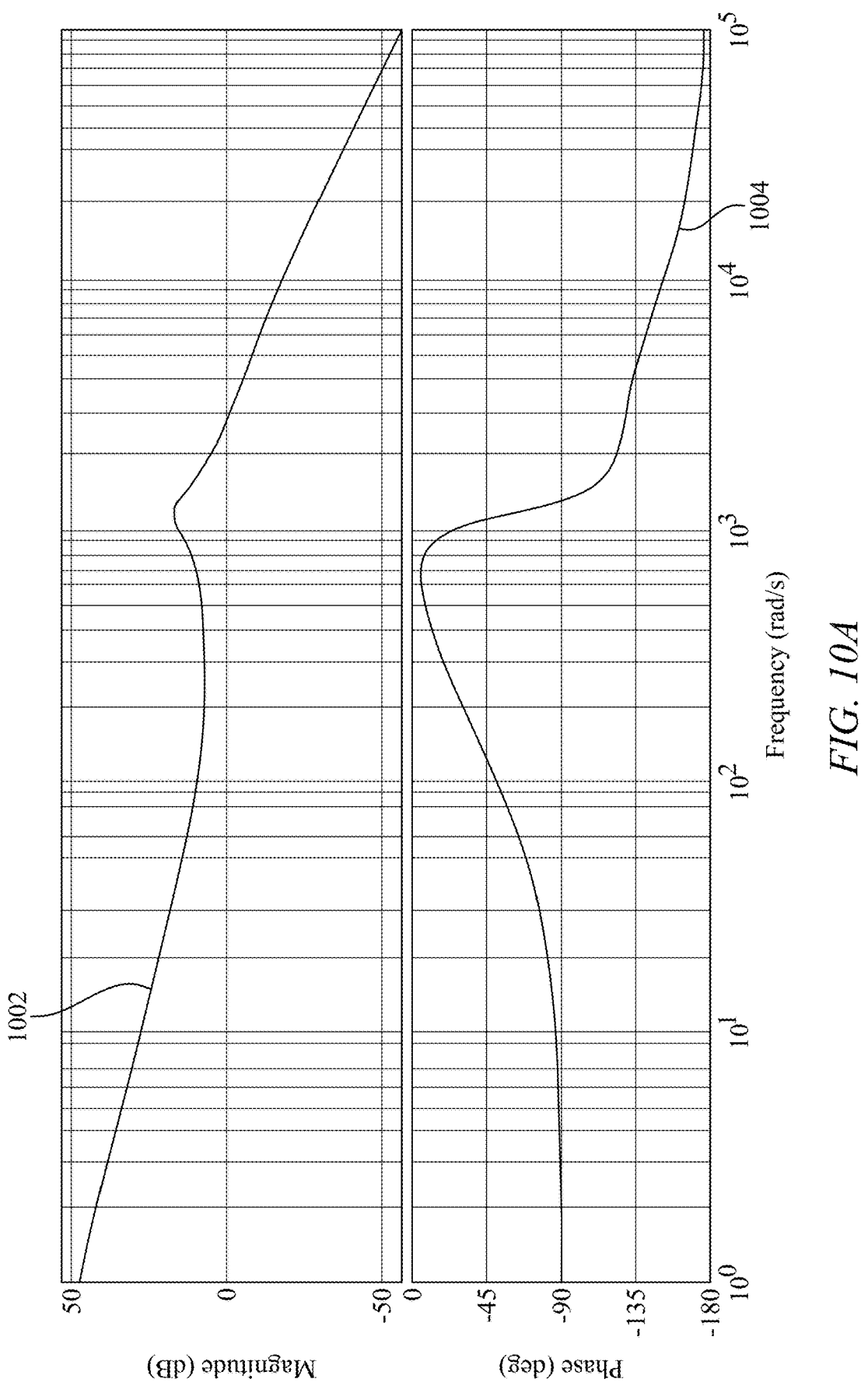
FIG. 10A is an exemplary graph illustrating a Bode plot of a BESS controller in a current control loop, according to aspects of the present disclosure.

FIG. 10A is an exemplary graph illustrating a Bode plot of the BESS controller in a current control loop. Curve 1002 represents a magnitude of the battery current in the current control loop. Curve 1004 represents a phase of the battery current in the current control loop.

Figure 10B:
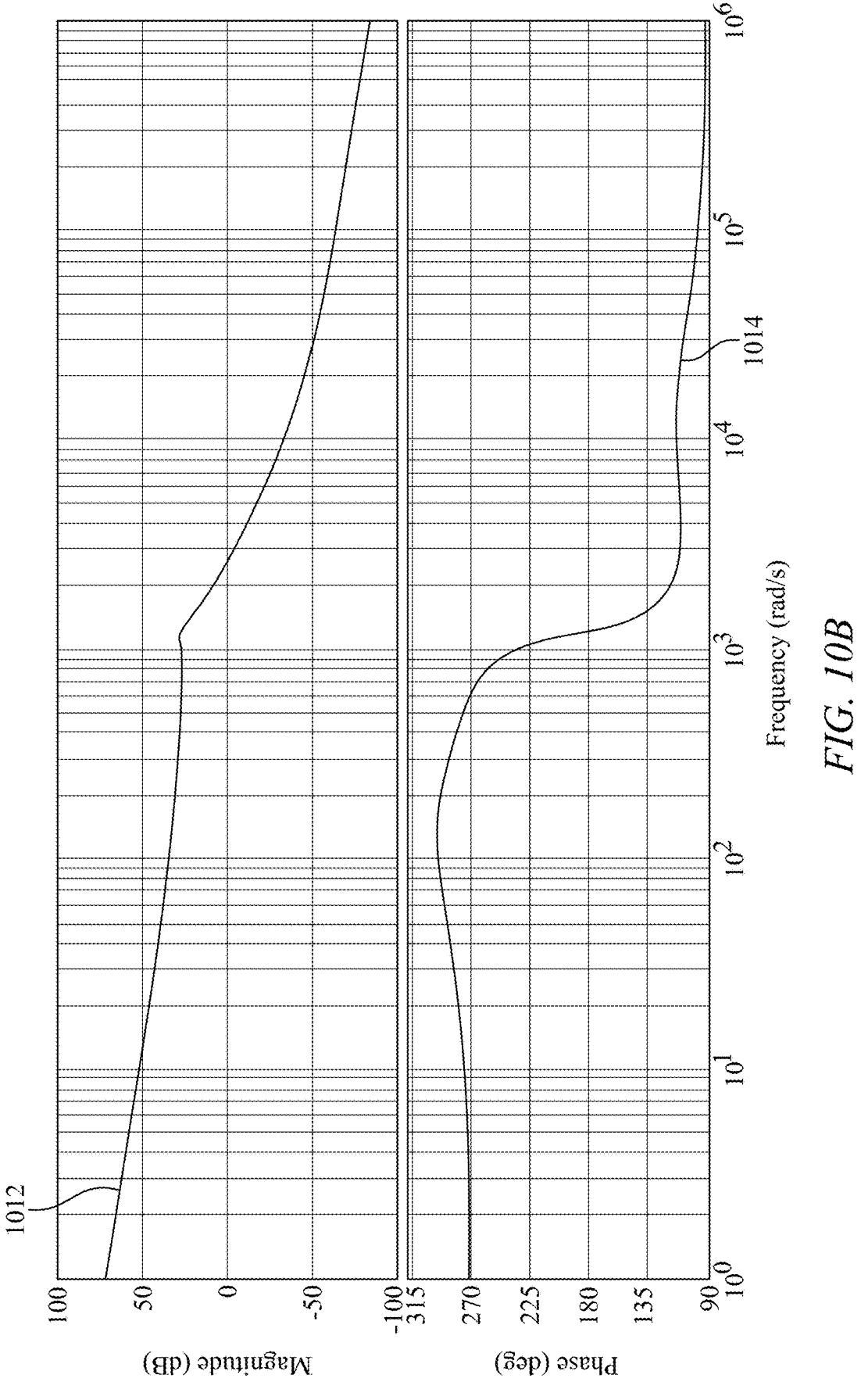
FIG. 10B is an exemplary graph illustrating a Bode plot of the BESS controller in a voltage control loop, according to aspects of the present disclosure.

FIG. 10B is an exemplary graph illustrating a Bode plot of the BESS controller in the voltage control loop. Curve 1012 represents a magnitude of the battery current in the voltage control loop. Curve 1014 represents a phase of the battery current in the voltage control loop.

Inductor current to duty ratio and output voltage to duty ratio small signal transfer functions are derived as:

$$G_{id} = \frac{190230.4(s + 130)}{(s^2 + 432s + 1412760.4)}, \tag{27}$$

$$G_{vd} = \frac{-0.369(s^2 - 11068s - 212703645)}{(s^2 + 432 + 1412760.4)}. \tag{28}$$

Also, the inductor current to duty ratio small signal transfer function can be derived as:

$$G_{id} = \frac{73166.1(s + 235.9)}{(s^2 + 259.5s + 9897944.2)}. \tag{29}$$

In an aspect of the present disclosure, a k-type compensator is used for controlling BESS. Accordingly, the bandwidth for the k-type compensator, employed with the power management controller in the BESS controllers, is kept small so as to emulate slow dynamic response of the BESS. In an example, the power management controller acts as a current controller configured to control the current of the BESS. In an aspect, the power management controller acts as a voltage controller to control the voltage of the BESS. For example, the current controller bandwidth is set to $f_{SW}/67$ of the switching frequency ($f_{SW}$), with a desired phase margin of 52°. Accordingly, the voltage controller is set to $f_{SW}/1380$. In an example, the switching frequency ($f_{SW}$) is set to 30 kHz. The transfer function of the current controller $T_i$ and the voltage controller $T_v$ are derived as follows:

$$T_i = \frac{78.7(s + 1179.8)}{s(s + 6511)} \tag{30}$$

-continued $$T_v = \frac{180.9(s + 83.8)}{s(s + 220)} \tag{31}$$

Figure 11:
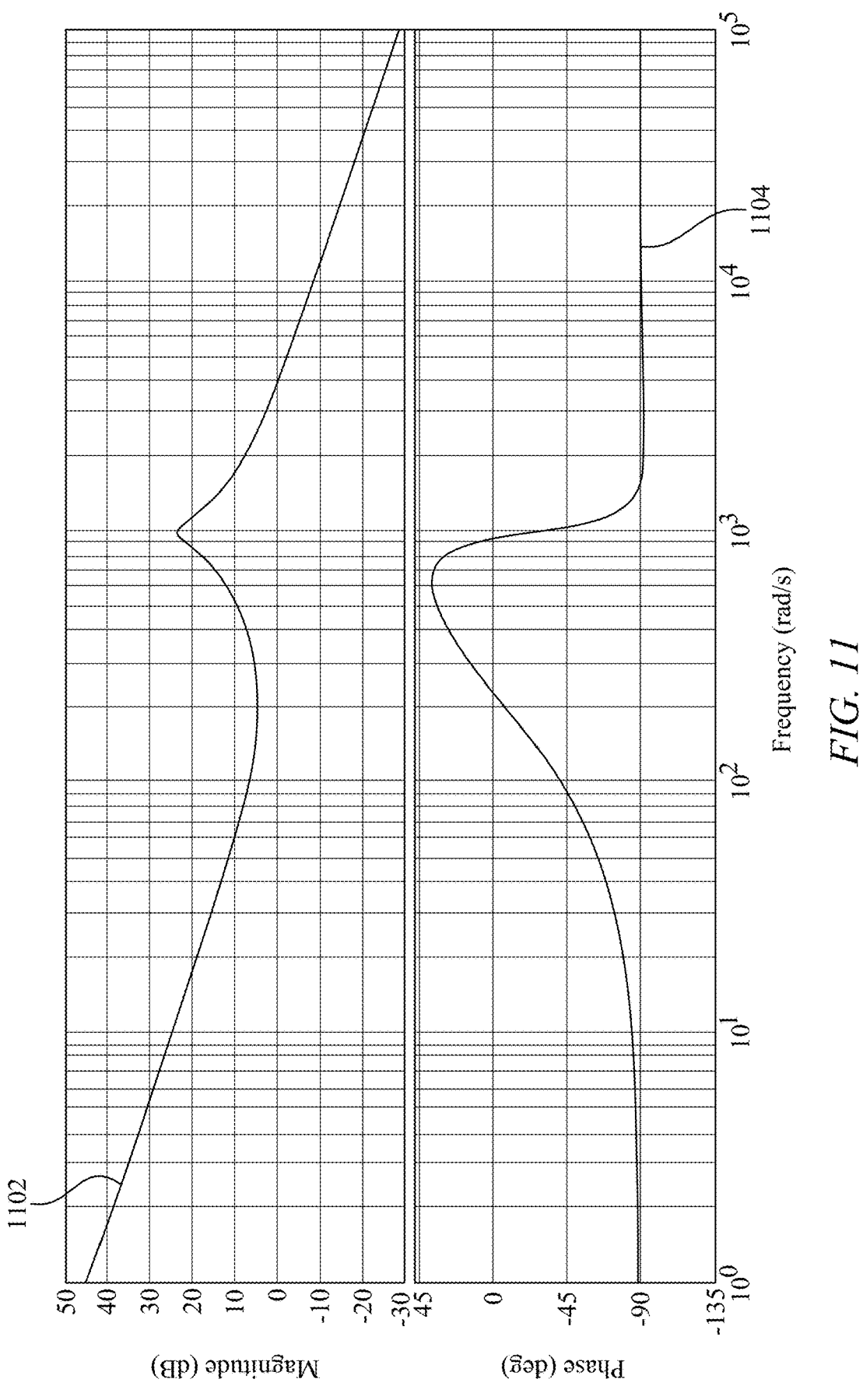
FIG. 11 is an exemplary graph illustrating a Bode plot of a current control loop of the SCSS, according to aspects of the present disclosure.

FIG. 11 is an exemplary graph illustrating a Bode plot of a current control loop of the SCSS. Curve 1102 represents a magnitude of the supercapacitor current in the current control loop. Curve 1104 represents a phase of the supercapacitor current in the current control loop. In case of the SCSS, a PI controller is configured to control the generated input current from the boost converter. The general transfer function is represented by equation (32).

$$T_{PI} = \frac{k_p s + k_i}{s} \tag{32}$$

The proportional gain constant (k_p) of the PI controller is set to 0.05, and integral gain (k_i) is taken as 10. A phase margin of the PI controller obtained is 87.7° and a bandwidth of 3914 rad/sec. The resultant Bode plot of the inner current control loop and the PI controller of the SCSS converter is represented in FIG. 11.

Figure 12:
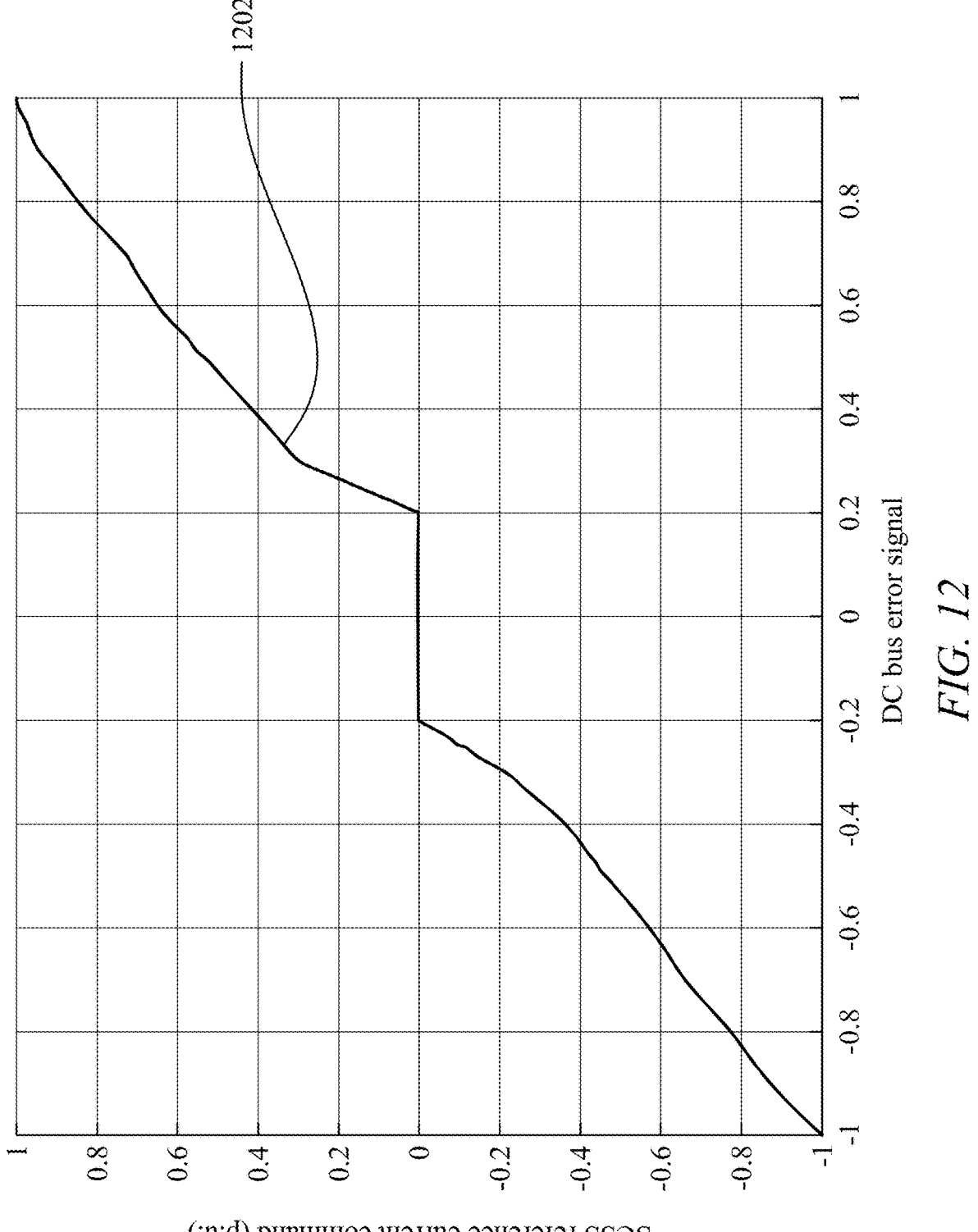
FIG. 12 is an exemplary graph illustrating an input and an output relationship obtained in a look up table (LUT) controller, according to aspects of the present disclosure.

FIG. 12 is an exemplary graph 1200 illustrating an input and an output relationship obtained in the LUT controller. The LUT controller is configured to receive the voltage error signal at the DC bus is taken as the input. The LUT controller is configured to match the voltage error signal to a corresponding supercapacitor current error signal, and generate an LUT current error signal (output voltage). In an example, the input signal (voltage error signal) is limited between −1 to 1 range. In another example, the generated output voltage (LUT current error signal) is limited between the range of −3 V to 3 V, which serves as the input signal to the LUT controller by reduction and normalization to ⅓^rd of its value. The LUT current error signal is amplified to boost the transient power compensation by multiplying the signal with the base value of the current hence generating the nominal value of SCSS reference current.

In an exemplary aspect, the disclosed SCSS controller is based on a subjective model based requirement of the SCSS and the microgrid. The graph shown in FIG. 12 depicts the relationship between the input of LUT controller, as voltage error of the DC link, and the generated SCSS current reference output to the LUT controller. The output is selected to remain during steady state error conditions, between −0.2 to 0.2 per unit (p.u.), and hence create a zero reference current for SCSS when the DC voltage error is low. Above these values, the output of the SCSS controller increases that is set non-linearly in accordance with the operational requirement deemed to be required for rapid voltage regulation of the DC link voltage.

The disclosed HESS 300 and the power management controller are analyzed and compared with the conventional LPF control strategy 200 in the DC microgrid. In an aspect, the DC microgrid is standalone with 480 W-PV power source with a desired reference voltage level (V_ref) of 48 V. The nominal parameters of the HESS 300 are given in Table 2. The analysis is performed for various load-generation variations in the DC microgrid. The regulation of DC bus magnitude and its degree of deviation is compared to mark the robustness of the HESS 300. In addition, a comparison is also presented between the BESS SoC for quantifying the efficacy of the power management controller 400 towards the reduction of BESS stress current and the subsequent increase in life span.

TABLE 2

| Parameters of the battery and the supercapacitor used in the HESS 300 | |
|---|---|
| Components | Ratings |
| Battery (BESS) | 24 V, 14 Ah |
| Supercapacitor (SCSS) | 32 V, 29 F |
| Inductance of BESS converter | 230 H |
| Output capacitance of BESS converter | 2000 F |
| Inductance of SCSS converter | 600 H |
| Output capacitance of SCSS converter | 1000 F |
| Inductor parasitic resistance | 0.1 Ω |
| Capacitor equivalent series resistance | 0.1 Ω |

The following examples are provided to illustrate further and to facilitate the understanding of the present disclosure.

First Experiment: Determining effect of increasing the abrupt load on the HESS 300 in comparison to a conventional LPF control strategy 200.

Figure 13A:
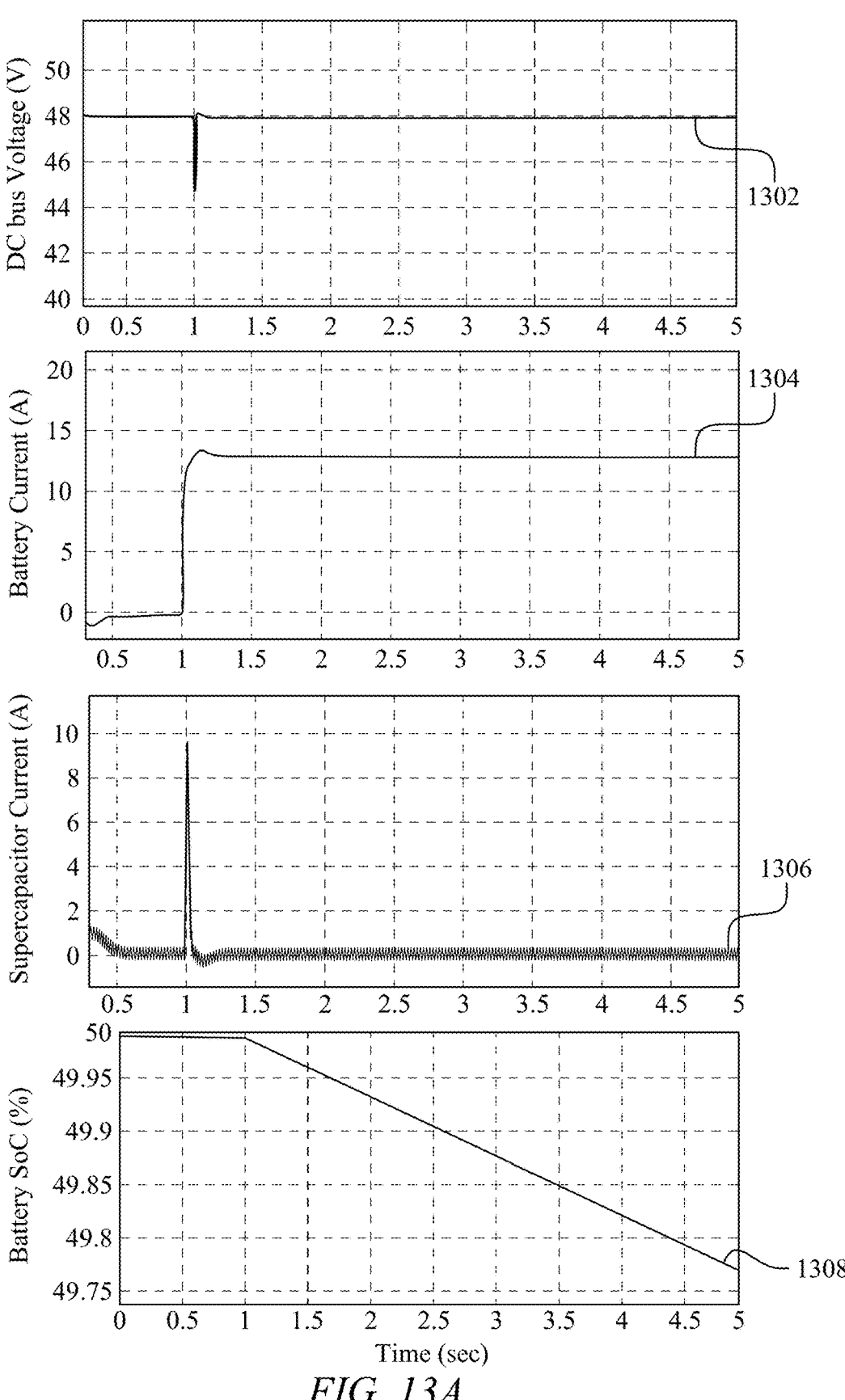
FIG. 13A shows exemplary graphs illustrating results obtained with abrupt increased load in the microgrid using a conventional LPF control strategy.

The first experiment was carried out for comparing the response of the HESS 300 in comparison to the conventional LPF control strategy 200 upon increasing the abrupt load. FIG. 13A shows exemplary graphs illustrating results obtained with an abrupt increased load in the microgrid using the conventional LPF control strategy. Curve 1302 represents the DC bus voltage in the microgrid. Curve 1304 represents the battery current in the microgrid. Curve 1306 represents the supercapacitor current in the microgrid. Curve 1308 represents the battery state of charge (SoC) in the microgrid.

During the first experiment, the load resistance was originally set to R_L=4.8Ω, that projected a load requirement of 10 A, and the solar PV panel operated at an irradiance, S=509 W/m², with temperature, T=25° C. The resultant generated power (P_spv) was 480 W at MPPT. At this initial stage, the DC bus voltage (V_dc) was at 48 V. During the operational period at t=0.1 sec, an abrupt increase in load demand from 10 A to 16.25 A was experienced by decreasing R_L to 2.95Ω. Therefore, V_dc drop was experienced at this instant and to maintain the voltage at 48 V, the surplus load demand was supplied by the HESS 300.

In the LPF control strategy 200, the BESS compensated the average power difference (300 W) experienced due to the load increment and reaches a steady state discharge current of 12.5 A at t=1.25 sec with an initial overshoot, as shown in FIG. 13A. Accordingly, the SCSS compensated for the short-term high frequency transient component to maintain the voltage at 48 V through a short-term current discharge.

Figure 13B:
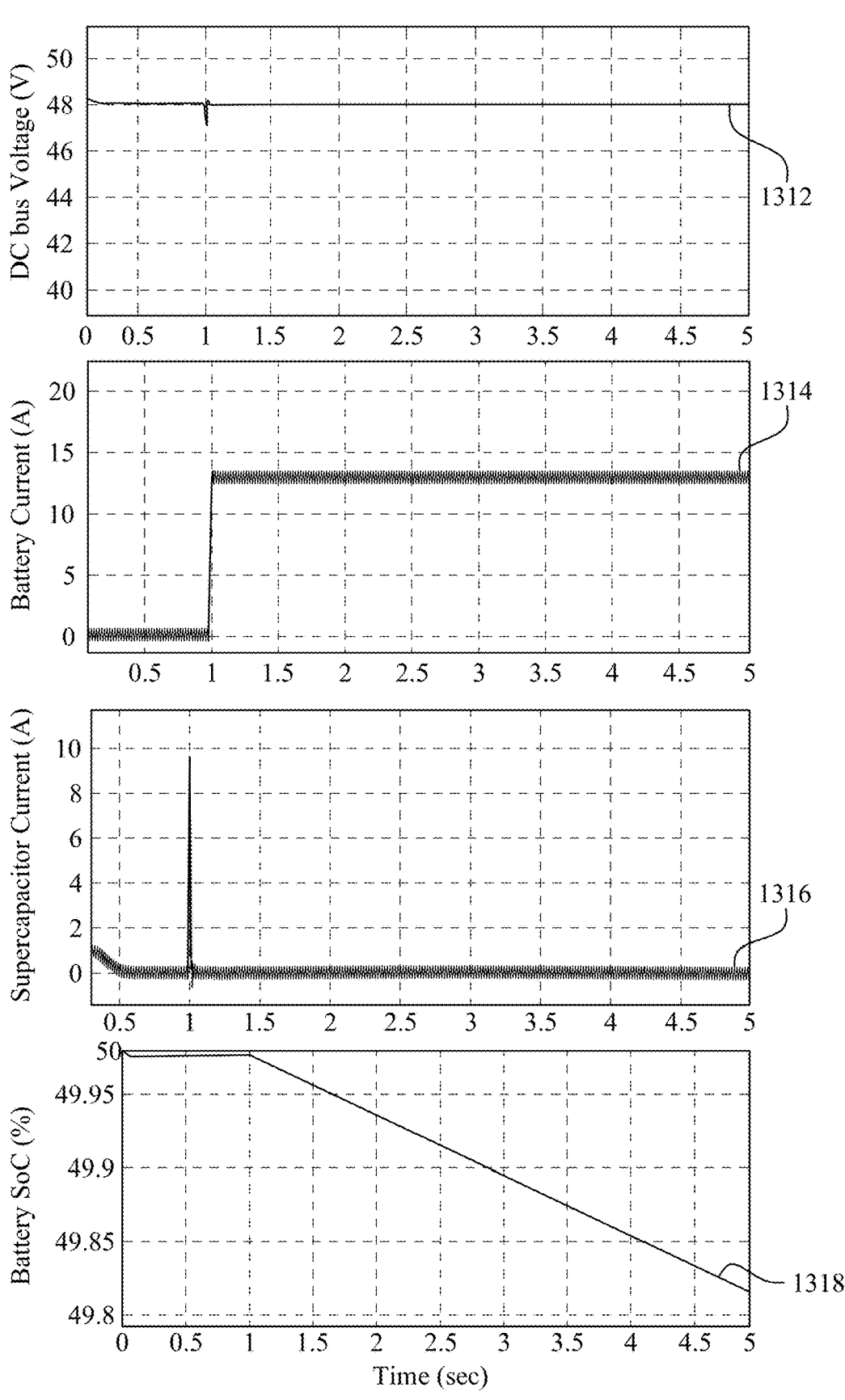
FIG. 13B shows exemplary graphs illustrating results obtained with abrupt increased load in the microgrid using the power management controller, according to aspects of the present disclosure.

FIG. 13B shows exemplary graphs illustrating results obtained with abrupt increased load in the microgrid having the power management controller 400. Curve 1312 represents the DC bus voltage in the microgrid. Curve 1314 represents the battery current in the microgrid. Curve 1316 represents the supercapacitor current in the microgrid. Curve 1318 represents the battery state of charge (SoC) in the microgrid.

Using the power management controller 400, the BESS reached a steady state current at of 12.5 At=1 sec with a negligible duration of the current overshoot, as shown in FIG. 13B. Similarly, the SCSS compensated for the short-term transient power mismatch and switched to a steady state comparatively faster than the conventional LPF control strategy 200.

The efficacy based comparison between these two methods is firstly made on the basis of voltage magnitude and its degree of deviation at the DC bus (V_dc). As observed in FIG. 13A-FIG. 13B, the conventional LPF control strategy 200 is unable to optimally regulate $V_{dc}$ during transient conditions and the voltage drop measured is 44 V, whereas using the power management controller 400, the voltage drop is 47 V. This is due to the slow dynamics of the BESS, that not only contributes to the voltage deviation and magnitude but also negatively impacts the BESS lifetime. Secondly, the impact on the BESS % SoC decrease is lower as compared to the conventional LPF control strategy 200 at the end of the operational analysis.

Second Experiment: Determining the effect of decreasing an abrupt load on the HESS 300 in comparison to the conventional LPF control strategy 200.

Figure 14A:
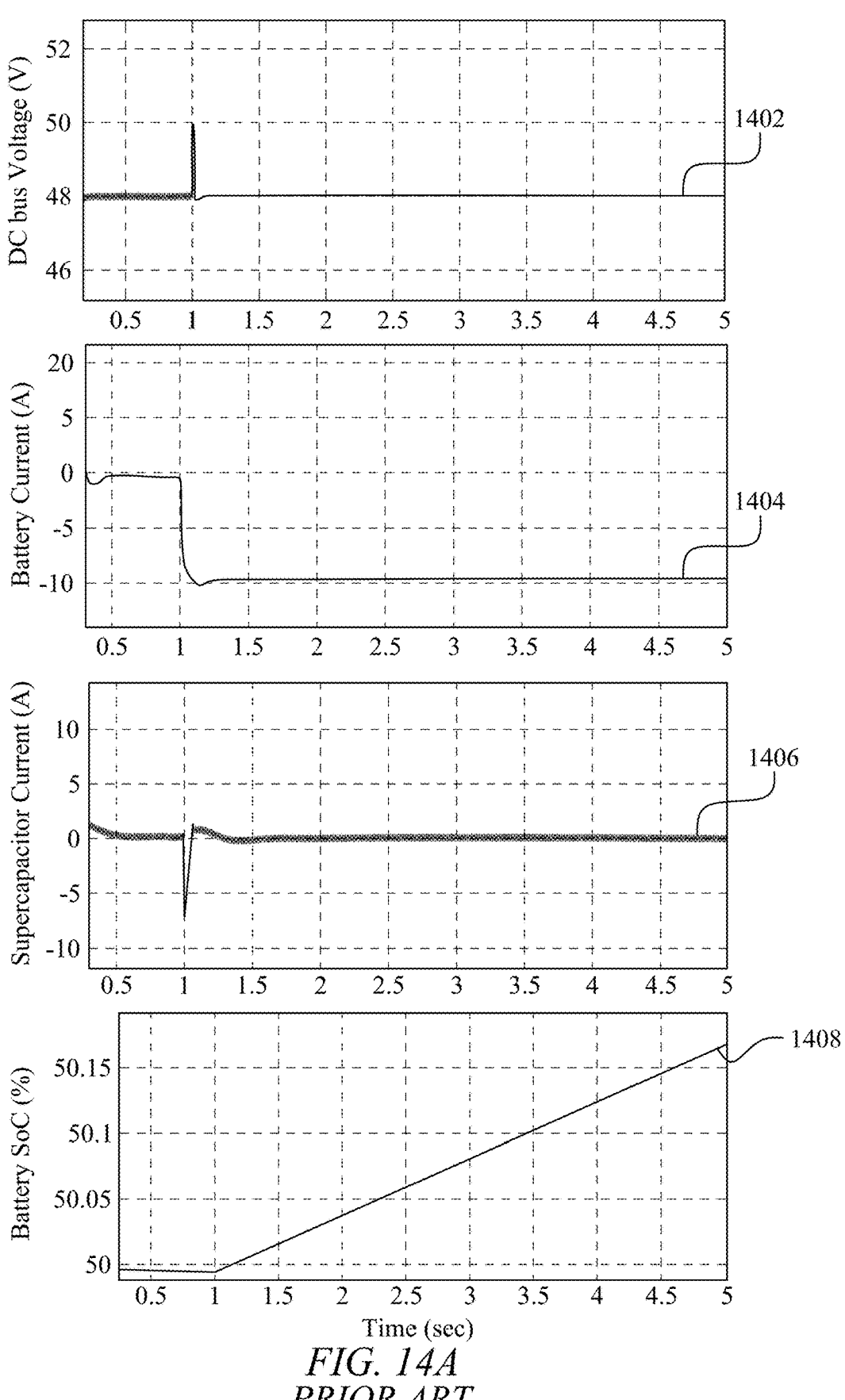
FIG. 14A shows exemplary graphs illustrating results obtained with abrupt load reduction in the microgrid using the conventional LPF control strategy.

The second experiment was carried out to compare the response of the HESS 300 in comparison to the conventional LPF control strategy 200 on decreasing the abrupt load. FIG. 14A shows exemplary graphs illustrating results obtained with abrupt load reduction in the microgrid using the conventional LPF control strategy. Curve 1402 represents the DC bus voltage in the microgrid. Curve 1404 represents the battery current in the microgrid. Curve 1406 represents the supercapacitor current in the microgrid. Curve 1408 represents the battery state of charge (SoC) in the microgrid.

During the second experiment, the solar PV panel was operated at S=509 W/m$^2$ and T=25° C. The resultant generated P$_{spv}$ was 480 W at MPPT and initially R$_L$ was set at 4.8Ω, that projected a load requirement of 10 A. At this initial stage, $V_{dc}$ was operated at 48 V. During the operational period, t=0.1 sec, an abrupt reduction in load demand from 10 A to 5 A was experienced by increasing R$_L$ to 9.6Ω. Therefore, a rise in $V_{dc}$ was experienced at this instant and to maintain the voltage at 48 V the surplus generation needed to be absorbed by the HESS components by charging the BESS and the SCSS.

In the conventional LPF control strategy, the BESS compensated the average power difference (240 W) experienced due to the decrease in load demand and reached a steady state charge current of 10 A at t=1.15 sec with an initial current overshoot, as shown in FIG. 14A. Accordingly, SCSS compensated for the short-term high frequency component to regulate the DC bus voltage.

Figure 14B:
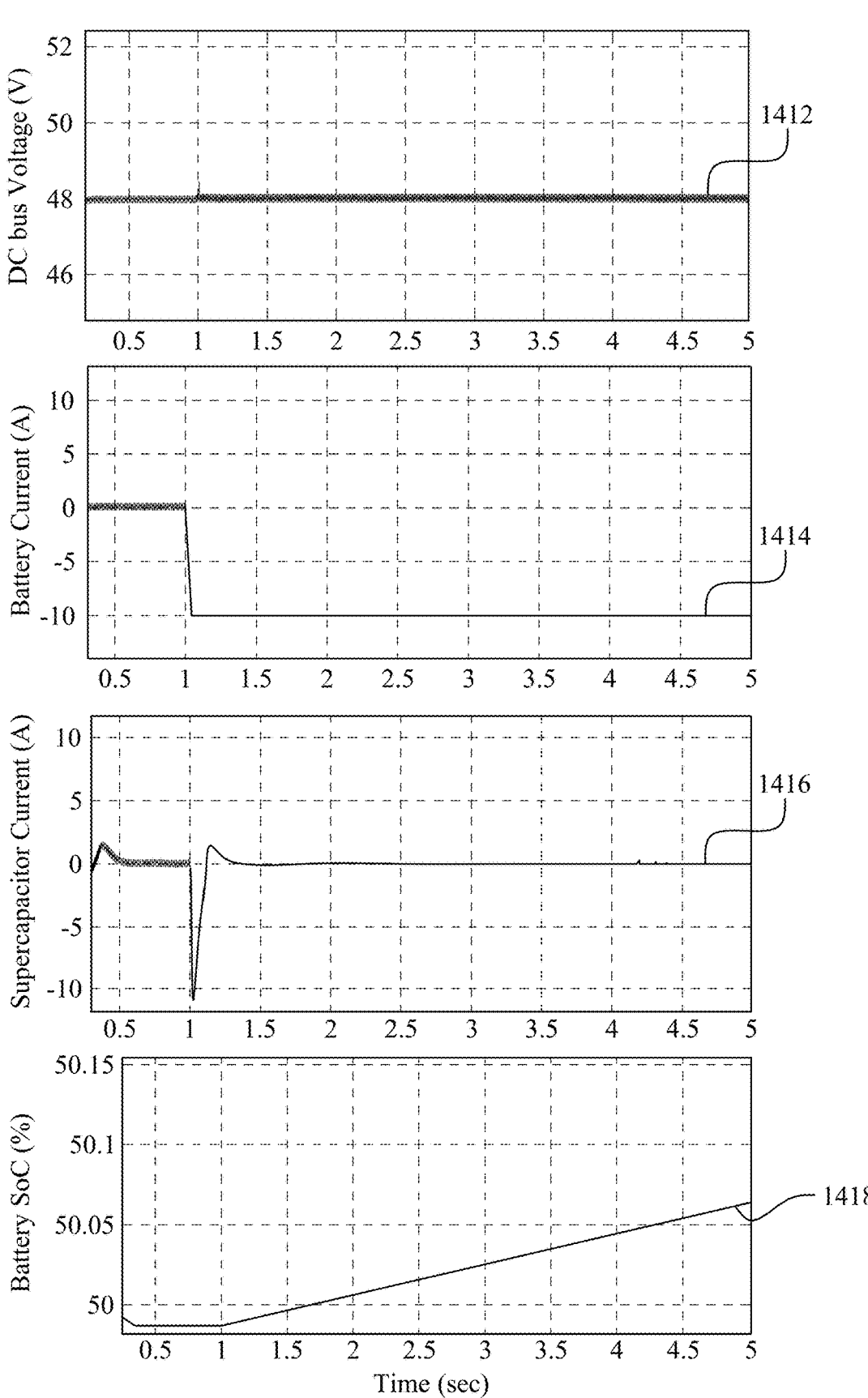
FIG. 14B shows exemplary graphs illustrating results obtained with abrupt load reduction in the microgrid using the power management controller, according to aspects of the present disclosure.

FIG. 14B is an exemplary graph illustrating results obtained with abrupt load reduction in the microgrid using the power management controller. Curve 1412 represents the DC bus voltage in the microgrid. Curve 1414 represents the battery current in the microgrid. Curve 1416 represents the supercapacitor current in the microgrid. Curve 1418 represents the battery state of charge (SoC) in the microgrid.

Using the power management controller 400, the BESS reached a steady state charge current at 10 A at t=1 s with a negligible duration of the current overshoot, as shown in FIG. 14B. Similarly, SCSS compensated for the short-term transient power mismatch to regulate $V_{dc}$ at 48 V through a short-term current charge of 7.5 A and switched to a steady state comparatively faster than the conventional LPF control strategy.

The efficacy based comparison between these two methods is first performed on the basis of voltage magnitude and its degree of deviation at the DC bus ($V_{dc}$). As observed in FIG. 14A-FIG. 14B, the conventional LPF control strategy 200 is unable to optimally regulate $V_{dc}$ during transient conditions, and the voltage rise experienced reached to 50 V, whereas in the HESS 300 the experienced voltage rise was 48.5 V. This is due to the slow dynamics of the BESS, attributed to the uncompensated current leading to this additional voltage deviation and magnitude and inclusively negatively impacted the BESS lifetime. Secondly, the impact on the BESS % SoC increase in the disclosed HESS

300 is less as compared to the conventional LPF control strategy 200 at the end of the operational analysis.

Third Experiment: Determining an effect of an abrupt increase in the solar PV generation on the HESS 300 in comparison to the conventional LPF control strategy.

Figure 15A:
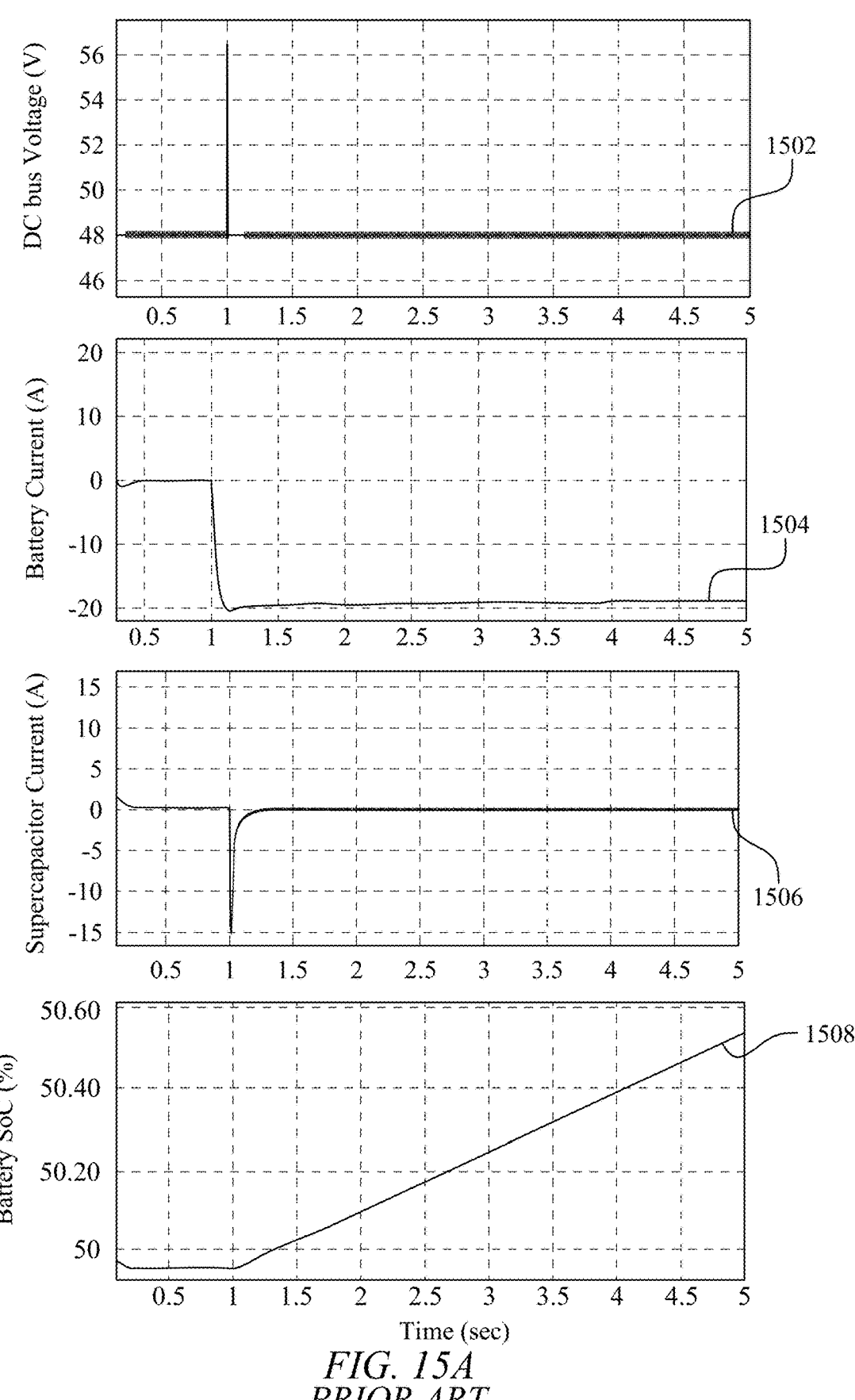
FIG. 15A shows exemplary graphs illustrating results obtained with abrupt increase in solar PV generation in the microgrid using the conventional LPF control strategy.

The third experiment was carried out to compare the response of the HESS 300 in comparison to the conventional LPF control strategy 200 on an abrupt increase in solar PV generation. FIG. 15A is an exemplary graph illustrating results obtained with an abrupt increase in solar PV generation in the microgrid using the conventional LPF control strategy. Curve 1502 represents the DC bus voltage in the microgrid. Curve 1504 represents the battery current in the microgrid. Curve 1506 represents the supercapacitor current in the microgrid. Curve 1508 represents the battery State of charge (SoC) in the microgrid.

During the third experiment, the load resistance was set to a constant R$_L$=4.8Ω during the entire operational analysis, which projected a load requirement of 10 A. The solar PV panel initially received S=509 W/m$^2$, with constant temperature, T=25° C. During the operational period at t=1 sec, the irradiance was abruptly increased to 990 W/m$^2$. The resultant generated power (P$_{spv}$) was therefore increased from 480 W to 960 W in the MPPT mode. A load-generation mismatch had occurred at this interval with a surplus of 480 W/m$^2$ generated from the PV. Accordingly, the impact on the DC bus voltage experienced a voltage rise, which was required to be regulated by redirecting this surplus power generation and charging the HESS.

In the conventional LPF control strategy, the BESS absorbs the surplus power generated by charging and compensating for the average power requirement of the system and reached a steady state current of 20 A at t=1.25 sec with an initial overshoot, as shown in FIG. 15A.

Figure 15B:
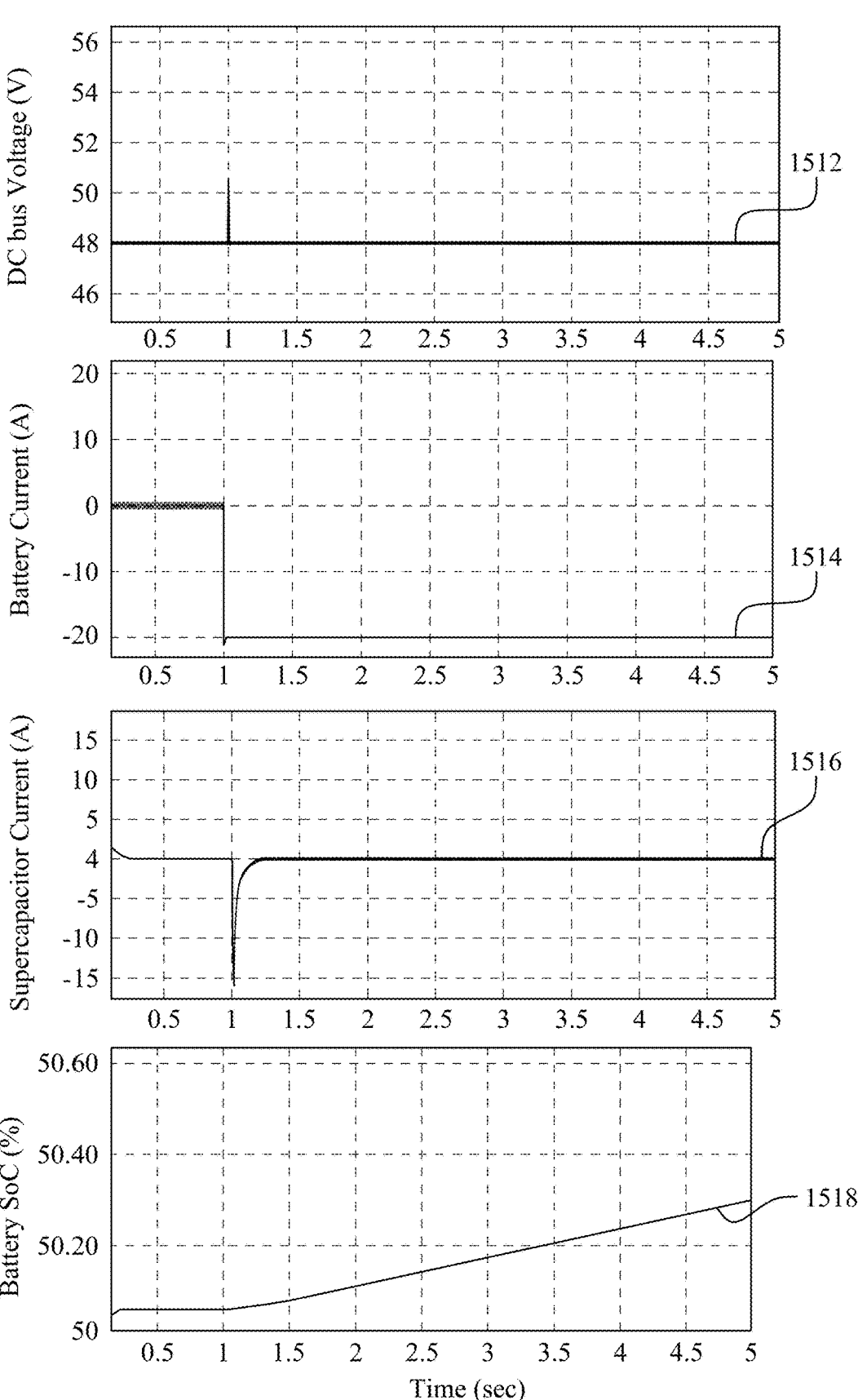
FIG. 15B shows exemplary graphs illustrating results obtained with abrupt increase in solar PV generation in the microgrid using the power management controller, according to aspects of the present disclosure.

FIG. 15B is an exemplary graph illustrating results obtained with an abrupt increase in solar PV generation in the microgrid using the power management controller 400. Curve 1512 represents the DC bus voltage in the microgrid. Curve 1514 represents the battery current in the microgrid. Curve 1516 represents the supercapacitor current in the microgrid. Curve 1518 represents the battery State of charge (SoC) in the microgrid.

Using the power management controller 400, the BESS current reached a steady state faster instantly at t=1 sec with a negligible duration of the current overshoot, as shown in FIG. 15B. The SCSS compensated for the short-term transient power mismatch by charging at 15 A and switching off to a steady state comparatively faster than the conventional LPF control strategy.

As observed in FIG. 15A-FIG. 15B, the conventional LPF control strategy 200 is unable to optimally regulate $V_{dc}$ during transient conditions and the voltage rise experienced goes upto to 56 V, whereas in the HESS 300 the voltage rise reaches 50 V. This is due to the slow dynamics of the BESS that results in a fractional uncompensated current that attributed towards the observed voltage deviation and its respective magnitude. Secondly, the impact on the BESS % SoC increase in the HESS 300 is less as compared to the conventional LPF control strategy 200 at the end of the operational analysis.

Fourth Experiment: Determining an effect of an abrupt reduction in the solar PV generation on the HESS 300 in comparison to the conventional LPF control strategy.

The fourth experiment was carried out to compare the response of the HESS 300 in comparison to the conventional LPF control strategy 200 on abrupt reduction in solar PV generation.

During the fourth experiment, initially the irradiance to the solar arrays was 509 W/m² and $R_L$ was kept constant during the whole operational span at 4.8Ω with a current demand at 10 A. During the t=1 sec of the operational period, the irradiance to the solar panels was abruptly decreased to 300 W/m² and the power generated by the PV decreased from 480 W to 280 W in the MPPT mode. The initial voltage was maintained at 48 V at the DC bus therefore, experienced a voltage drop at t=1 sec and thus the voltage regulation was required by the discharging of the HESS to overcome the deficient power supply to the load.

Figure 16A:
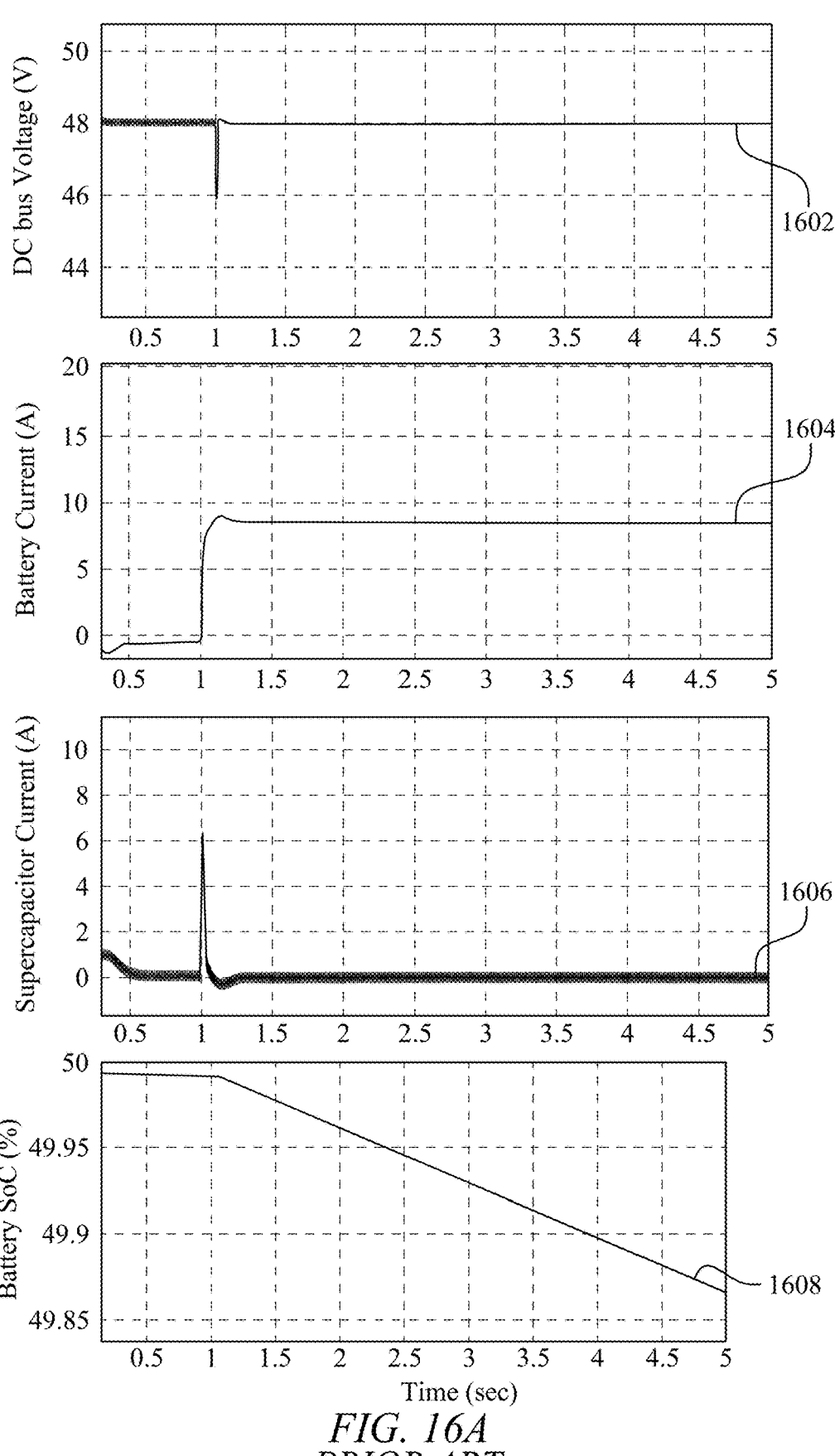
FIG. 16A shows exemplary graphs illustrating results obtained with abrupt reduction in solar PV generation in the microgrid using the conventional LPF control strategy.

FIG. 16A is an exemplary graph illustrating results obtained with abrupt reduction in solar PV generation in the microgrid using a conventional LPF control strategy. Curve 1602 represents the DC bus voltage in the microgrid. Curve 1604 represents the battery current in the microgrid. Curve 1606 represents the supercapacitor current in the microgrid. Curve 1608 represents the battery state of charge (SoC) in the microgrid.

In the conventional LPF control strategy, the BESS compensates the average deficient energy supply (200 W) experienced between the load and the generation and reaches a steady state current of 8.34 A at t=1.2 sec with an initial overshoot, as shown in FIG. 16A.

Figure 16B:
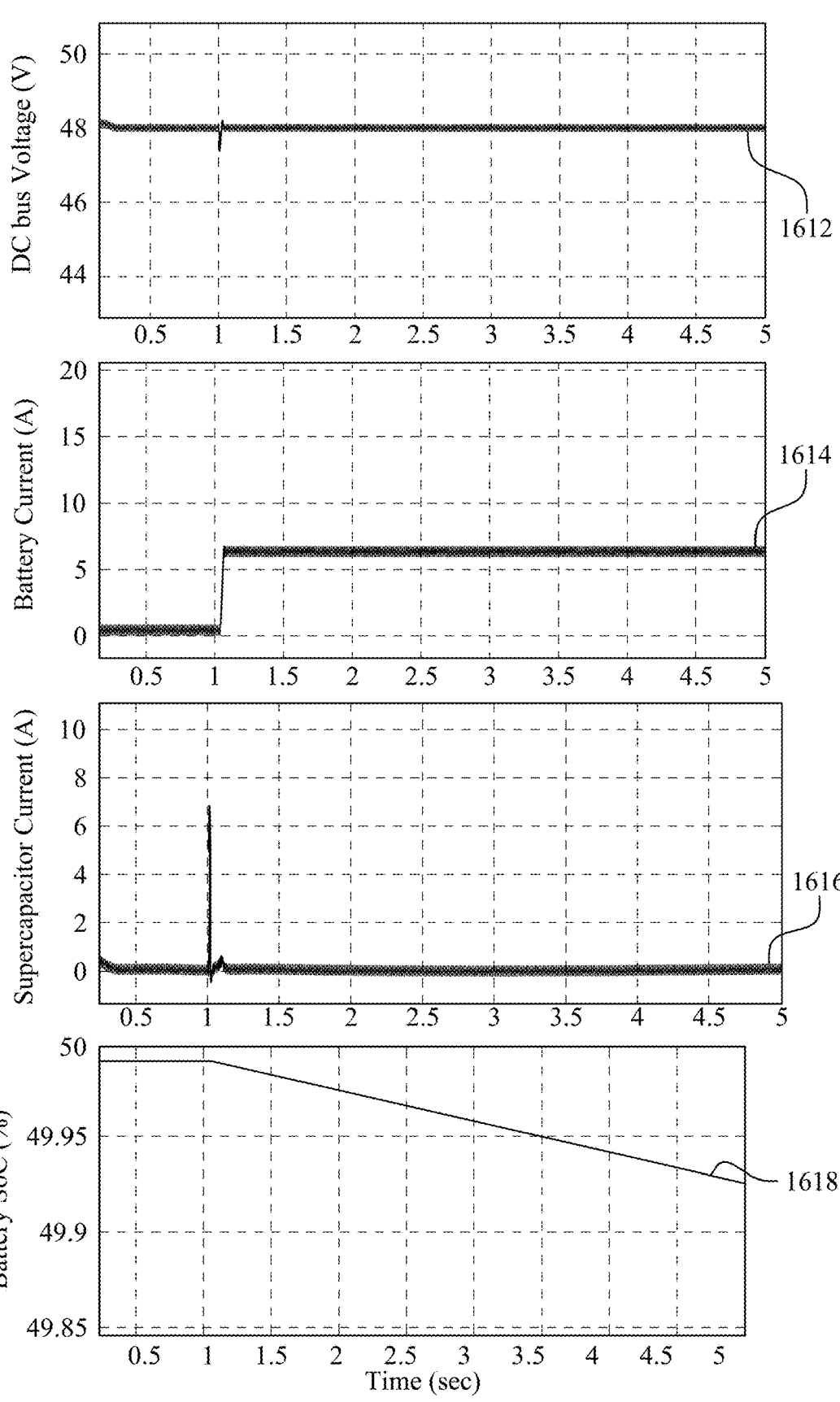
FIG. 16B shows exemplary graphs illustrating results obtained with abrupt reduction in solar PV generation in the microgrid using the power management controller, according to aspects of the present disclosure.

FIG. 16B is an exemplary graph illustrating results obtained with an abrupt reduction in solar PV generation in microgrid using the power management controller. Curve 1612 represents the DC bus voltage in the microgrid. Curve 1614 represents the battery current in the microgrid. Curve 1616 represents the supercapacitor current in the microgrid. Curve 1618 represents the battery state of charge (SoC) in the microgrid.

Using the power management controller 400, the BESS instantly reached a steady state current at 10 A in t=1 sec with a negligible duration of the current overshoot, as shown in FIG. 16B. The SCSS provided short-term transient power compensation and operated until the BESS reached its steady state condition.

As observed in FIG. 16A-FIG. 16B, the conventional LPF control strategy 200 was unable to optimally regulate $V_{dc}$ during transient conditions and a transient voltage drop of 46 V is experienced, whereas in the HESS 300, the voltage drop was 47.5 V. This is due to the slow dynamics of BESS, which inherently curtails the required response resulting in an uncompensated current that contributes to the voltage deviation and negatively impacts the BESS life cycle. Secondly, the impact on the BESS % SoC decrease in the HESS 300 is less as compared to the conventional LPF control strategy 200 at the end of the operational analysis.

In an aspect, the present disclosure discloses a control strategy to regulate the DC bus voltage and improve the power quality during transient/abrupt power variation in the microgrid. The disclosed control strategy is based on optimal power allocation between the hybrid energy storage systems. The strategy is based on a decoupled allocation between the BESS and the SCSS utilizing k-type compensators and non-linear PI controller (NPIC). The disclosed control strategy has been designed and categorically validated on numerous cases of power mismatch that are experienced from the renewable based generation and the loads. The observed results exhibit an improved voltage regulation with enhanced the BESS and the SCSS response. In addition, the results are systematically compared with a benchmark LPF control strategy. For the test, the HESS 300 was regulated at 48 V for various abrupt load-generation, and the HESS 300 improves the voltage regulation by and average of 4.4% in case of deficient power and 7% in case of excess power scenarios with reduction in BESS current stress with comparatively more suitable BESS-SOC performance. This observation concurs that the disclosed control strategy significantly reduces the voltage deviation magnitude at the PCC during load-generation mismatch, and the BESS lifetime is comparatively improved. Therefore, the power management controller 400 facilities an overall faster transient response with simplistic modelling.

The first embodiment is illustrated with respect to FIGS. 1-9. The first embodiment describes a hybrid energy storage system (HESS) 300 for power management of a microgrid. The HESS includes 300 a plurality of renewable energy sources (RES) 302a, 302b, . . . , 302n located within the microgrid, wherein each RES 302a, 302b, . . . , 302n is configured to generate a current $I_{RES}$; a plurality of power converters 304a, 304b, . . . , 304n, wherein each RES is connected to a power converter, wherein each power converter 304a, 304b, . . . , 304n generates a DC voltage $V_{dc}$ from the current $I_{RES}$; a DC bus 305 connected to the plurality of power converters, wherein the DC bus 305 is configured to receive the DC voltage $V_{dc}$; a power management controller 306 configured to control: a battery energy storage system (BESS) 308 including a battery 310, wherein the battery is connected to receive the DC voltage $V_{dc}$ and generate a battery current $I_{batt}$, and a supercapacitor energy storage system (SCSS) 314 including a supercapacitor 316, wherein the supercapacitor is connected to receive the DC voltage $V_{dc}$ and generate a supercapacitor current $I_{SC}$.

In an aspect, the HESS 300 includes a first bidirectional converter 312 connected across a positive terminal and a negative terminal of the battery, and a second bidirectional converter 318 connected across a positive terminal and a negative terminal of the SCSS.

In an aspect, the power management controller 306, 400 includes a first adder 402 configured to receive the DC voltage $V_{dc}$ from the DC bus, subtract the DC voltage $V_{DC}$ from a voltage reference $V_{ref}$, and generate a voltage error signal; a voltage controller 404 connected to the first adder, wherein the voltage controller 404 is configured to receive the voltage error signal and generate a gain modified battery current; a second adder 406 connected to the voltage controller 404, wherein the second adder 406 is configured to subtract the battery current $I_{batt}$ from the gain modified battery current and generate a battery current error signal; a current controller 408 connected to the second adder, wherein the current controller 408 is configured to compensate a phase difference between the battery current $I_{batt}$ and the battery current error signal, and generate a phase and gain compensated battery current error signal; a first pulse width modulator (PWM) controller 410 connected to the current controller, wherein the first PWM controller 410 is configured to generate a low power frequency current $I_{LPF}$ from the phase and gain compensated battery current error signal; and a battery switch $SW_b$ connected to the first PWM controller 410, wherein the first PWM controller 410 is configured to actuate the battery switch $SW_b$ to transmit the low power frequency current $I_{LPF}$ to the first bidirectional converter 414, wherein the first bidirectional converter is configured to charge the battery 412 with the low power frequency current, $I_{LPF}$.

In an aspect, the voltage controller 404 is a type II voltage compensator configured to adjust the gain of the DC voltage $V_{dc}$ to match a desired gain v; and the current controller 408 is a type II current compensator configured to compensate the phase difference between the battery current $I_{batt}$ and the battery current error signal.

In an aspect, the power management controller 400 further includes a look up table LUT controller 416 connected to the first adder 402, wherein the LUT controller 416 is configured to receive the voltage error signal, match the voltage error signal to a corresponding supercapacitor current error signal, and generate an LUT current error signal; a third adder 418 connected to the LUT controller 416, wherein the third adder 418 is configured to subtract the supercapacitor current $I_{SC}$, from the LUT current error signal and generate a supercapacitor current error signal; a proportional integral (PI) controller 420 configured to receive the supercapacitor current error signal, correct the supercapacitor current, $I_{SC}$, and generate a corrected supercapacitor current; a second PWM controller 422 connected to the PI controller 420, wherein the second PWM controller 422 is configured to receive the corrected supercapacitor current and generate a high power frequency current, $I_{HPF}$; and a supercapacitor switch, $SW_{SC}$, connected to the second PWM controller 422, wherein the second PWM controller 422 is configured to actuate the supercapacitor switch, $SW_b$, to transmit the high power frequency current, $I_{HPF}$, to the second bidirectional converter 424, wherein the second bidirectional converter is configured to charge the supercapacitor 426 with the high power frequency current, $I_{HPF}$.

In an aspect, a point of common contact (PCC) is configured to connect the hybrid energy storage system to any of an AC load, a DC load, and a utility grid, wherein the first bidirectional converter is connected to the PCC and configured to supply DC current and DC voltage from the battery to the PCC, and the second bidirectional converter is connected to the PCC and configured to supply AC current and AC voltage to the PCC.

In an aspect, the voltage controller 404 is configured to adjust the gain of the DC voltage $V_{dc}$ to match the desired gain v by converting the voltage error signal to a frequency domain having a frequency s, identifying poles $w_z$ and $w_p$ in the voltage error signal in the frequency domain, and restricting a transfer function $H_T(s)$ of the voltage controller to:

$$H_T(s) = v\left(\frac{1 + \dfrac{w_z}{s}}{1 + \dfrac{s}{w_p}}\right).$$

In an aspect, the current controller 408 is configured to compensate the phase difference between the battery current $I_{batt}$ and the battery current error signal by boosting the phase such that:

$$f_p = \tan\left(\frac{\text{phase boost}}{2} + \frac{\pi}{4}\right)f_c$$

$$f_z = \frac{f_c}{\tan\left(\dfrac{\text{phase boost}}{2} + \dfrac{\pi}{4}\right)},$$

where $f_c$ is a zero crossover frequency of the poles.

The second embodiment is illustrated with respect to FIGS. 1-9. The second embodiment describes a method for power management of a hybrid energy storage system (HESS) 300 of a microgrid. The method includes generating, by a plurality of renewable energy sources (RES) 302a, 302b, . . . , 302n located within the microgrid, a current $I_{RES}$. The method includes generating, by a plurality of power converters 304a, 304b, . . . , 304n, wherein each RES is connected to a power converter, a DC voltage $V_{dc}$ from the current $I_{RES}$. The method includes receiving, by a DC bus 305 connected to the plurality of power converters, the DC voltage $V_{dc}$. The method includes receiving, by a battery 310 of a battery energy storage system (BESS) 308, the DC voltage $V_{dc}$ and generating a battery current $I_{batt}$. The method includes receiving, by a supercapacitor 316 of a supercapacitor energy storage system (SCSS) 314, the DC voltage $V_{dc}$ and generating a supercapacitor current $I_{SC}$.

In an aspect, the method includes connecting a first bidirectional converter 312 across a positive terminal and a negative terminal of the battery; and connecting a second bidirectional converter 318 across a positive terminal and a negative terminal of the SCSS.

In an aspect, the method includes receiving, by a first adder 402, the DC voltage $V_{dc}$ from the DC bus, subtracting the DC voltage $V_{DC}$ from a voltage reference $V_{ref}$, and generating a voltage error signal; receiving, by a voltage controller 404 connected to the first adder, the voltage error signal and generating a gain modified battery current; subtracting, by a second adder 406 connected to the voltage controller, the battery current $I_{batt}$ from the gain modified battery current and generating a battery current error signal; compensating, by a current controller 408 connected to the second adder, a phase difference between the battery current $I_{batt}$ and the battery current error signal and generating a phase and gain compensated battery current error signal; generating, by a first pulse width modulator (PWM) controller 410 connected to the current controller, a low power frequency current $I_{LPF}$ from the phase and gain compensated battery current error signal; actuating, a battery switch $SW_b$ by the first PWM controller, to transmit the low power frequency current $I_{LPF}$ to the first bidirectional converter 414; and charging the battery 412 with the low power frequency current, $I_{LPF}$.

In an aspect, the method includes receiving, by a look up table LUT controller 416 connected to the first adder 402, the voltage error signal; matching, by the LUT controller 416, the voltage error signal to a corresponding supercapacitor current error signal; generating, by the LUT controller, an LUT current error signal; receiving, by a third adder 418 connected to the LUT controller, the LUT current error signal; subtracting, by the third adder 418, the supercapacitor current $I_{SC}$, from the LUT current error signal; generating, by the third adder, a supercapacitor current error signal; receiving, by a proportional integral (PI) controller 420, the supercapacitor current error signal; correcting, by the PI controller, the supercapacitor current, $I_{SC}$; generating, by the PI controller, a corrected supercapacitor current; receiving, by a second PWM controller 422 connected to the PI controller, the corrected supercapacitor current; generating, by the second PWM controller 422, a high power frequency current, $I_{HPF}$; actuating, by the second PWM controller, a supercapacitor switch $SW_{SC}$; and transmitting, by the supercapacitor switch $SW_{SC}$ the high power frequency current, $I_{HPF}$, to the second bidirectional converter 424, wherein the second bidirectional converter is configured to charge the supercapacitor 426 with the high power frequency current, $I_{HPF}$.

In an aspect, the method includes connecting the first bidirectional converter 414 is connected to a point of common contact (PCC); supplying DC current and DC voltage from the battery to the PCC; connecting the second bidirectional converter 424 to the PCC; and supplying AC current and AC voltage to the PCC from the supercapacitor.

In an aspect, the method includes adjusting, by the voltage controller 404, the gain of the DC voltage $V_{dc}$ to match the desired gain v by: converting the voltage error signal to a frequency domain having a frequency s, identifying poles $w_z$ and $w_p$ in the voltage error signal in the frequency domain, and restricting a transfer function $H_T(s)$ of the voltage controller to:

$$H_T(s) = v\left(\frac{1 + \frac{w_z}{s}}{1 + \frac{s}{w_p}}\right).$$

In an aspect, the method includes compensating, by the current controller 408, the phase difference between the battery current $I_{batt}$ and the battery current error signal by boosting the $$f_p = \tan\left(\frac{\text{phase boost}}{2} + \frac{\pi}{4}\right)f_c$$

$$f_z = \frac{f_c}{\tan\left(\frac{\text{phase boost}}{2} + \frac{\pi}{4}\right)},$$

where $f_c$ is a zero crossover frequency of the poles.

The third embodiment is illustrated with respect to FIGS. 1-9. The third embodiment describes a non-transitory computer readable medium having instructions stored therein that, when executed by one or more processors, cause the one or more processors to perform a method for power management of the hybrid energy storage system (HESS) 300 of the microgrid. The method includes generating, by a plurality of renewable energy sources (RES) 302a, 302b, . . . , 302n located within the microgrid, a current $I_{RES}$; generating, by a plurality of power converters 304a, 304b, . . . , 304n, wherein each RES is connected to a power converter, a DC voltage $V_{dc}$ from the current $I_{RES}$; receiving, by a DC bus 305 connected to the plurality of power converters, the DC voltage $V_{dc}$; receiving, by a battery 310 of a battery energy storage system (BESS) 308, the DC voltage $V_{dc}$ and generating a battery current $I_{batt}$; and receiving, by a supercapacitor 316 of a supercapacitor energy storage system (SCSS) 314, the DC voltage $V_{dc}$ and generating a supercapacitor current $I_{SC}$.

In an aspect, the method includes receiving, by a first adder 402, the DC voltage $V_{dc}$ from the DC bus, subtracting the DC voltage $V_{DC}$ from a voltage reference $V_{ref}$, and generating a voltage error signal; receiving, by a voltage controller 404 connected to the first adder, the voltage error signal and generating a gain modified battery current; subtracting, by a second adder 406 connected to the voltage controller, the battery current $I_{batt}$ from the gain modified battery current and generating a battery current error signal; compensating, by a current controller 408 connected to the second adder, a phase difference between the battery current $I_{batt}$ and the battery current error signal and generating a phase and gain compensated battery current error signal; generating, by a first pulse width modulator (PWM) controller 410 connected to the current controller, a low power frequency current $I_{LPF}$ from the phase and gain compensated battery current error signal; actuating, a battery switch $SW_b$ by the first PWM controller, to transmit the low power frequency current $I_{LPF}$ to a first bidirectional converter 414 connected in parallel with the battery 412; and charging the battery 412 with the low power frequency current, $I_{LPF}$.

In an aspect, the method includes receiving, by a look up table LUT controller 416 connected to the first adder 402, the voltage error signal; matching, by the LUT controller, the voltage error signal to a corresponding supercapacitor current error signal; generating, by the LUT controller, an LUT current error signal; receiving, by a third adder 418 connected to the LUT controller, the LUT current error signal; subtracting, by the third adder, the supercapacitor current $I_{SC}$, from the LUT current error signal; generating, by the third adder, a supercapacitor current error signal; receiving, by a proportional integral (PI) controller 420, the supercapacitor current error signal; correcting, by the PI controller, the supercapacitor current, $I_{SC}$; generating, by the PI controller, a corrected supercapacitor current; receiving, by a second PWM controller connected to the PI controller, the corrected supercapacitor current; generating, by the second PWM controller, a high power frequency current, $I_{HPF}$; actuating, by the second PWM controller 422, a supercapacitor switch $SW_{SC}$; and transmitting, by the supercapacitor switch $SW_{SC}$ the high power frequency current, $I_{HPF}$, to a second bidirectional converter 424 connected in parallel with the supercapacitor 426, wherein the second bidirectional converter is configured to charge the supercapacitor with the high power frequency current, $I_{HPF}$.

In an aspect, the method includes adjusting, by the voltage controller 404, the gain of the DC voltage $V_{dc}$ to match the desired gain v by: converting the voltage error signal to a frequency domain having a frequency s, identifying poles $w_z$ and $w_p$ in the voltage error signal in the frequency domain, and restricting a transfer function $H_T(s)$ of the voltage controller to:

$$H_T(s) = v\left(\frac{1 + \frac{w_z}{s}}{1 + \frac{s}{w_p}}\right).$$

In an aspect, the method includes compensating, by the current controller 408, the phase difference between the battery current $I_{batt}$ and the battery current error signal by boosting the phase such that:

$$f_p = \tan\left(\frac{\text{phase boost}}{2} + \frac{\pi}{4}\right)f_c$$

$$f_z = \frac{f_c}{\tan\left(\frac{\text{phase boost}}{2} + \frac{\pi}{4}\right)},$$

where $f_c$ is a zero crossover frequency of the poles.

Figure 17:
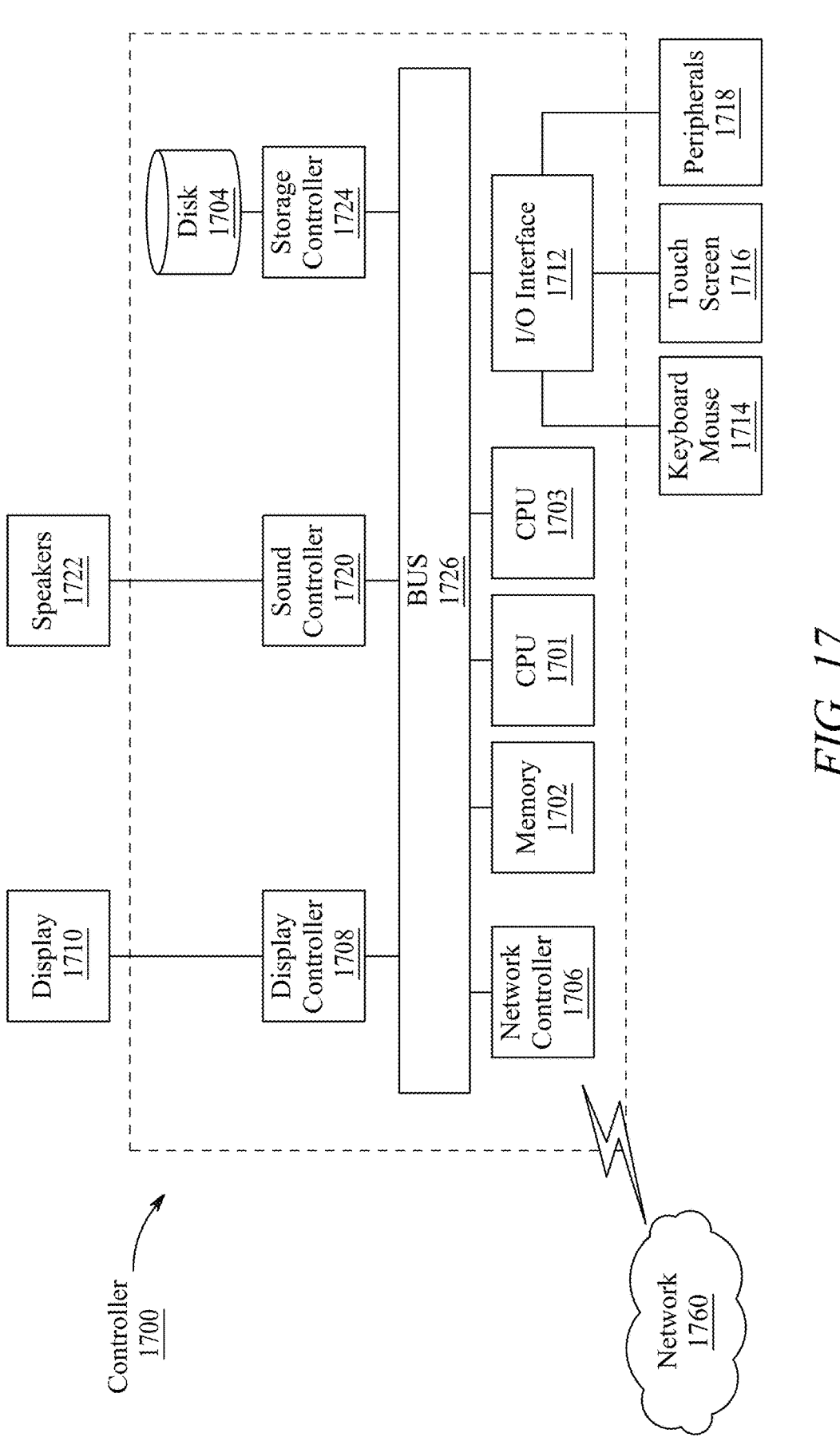
FIG. 17 is an illustration of a non-limiting example of details of computing hardware used in the computing system, according to aspects of the present disclosure.

Next, further details of the hardware description of the computing environment of FIG. 3 according to exemplary embodiments is described with reference to FIG. 17. In FIG. 17, a controller 1700 is described as representative of the power management controller of FIG. 3 in which the controller is a computing device which includes a CPU 1701 which performs the processes described above/below. The process data and instructions may be stored in memory 1702. These processes and instructions may also be stored on a storage medium disk 1704 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 1701, 1703 and an operating system such as Microsoft Windows 9, Microsoft Windows 10, UNIX, Solaris, LINUX, Apple MAC-OS and other systems known to those skilled in the art.

The hardware elements in order to achieve the computing device may be realized by various circuitry elements, known to those skilled in the art. For example, CPU 1701 or CPU 1703 may be a Xenon or Core processor from Intel of America or an Opteron processor from AMD of America, or may be other processor types that would be recognized by one of ordinary skilled in the art. Alternatively, the CPU 1701, 1703 may be implemented on an FPGA, ASIC, PLD or using discrete logic circuits, as one of ordinary skilled in the art would recognize. Further, CPU 1701, 1703 may be implemented as multiple processors cooperatively working in parallel to perform the instructions of the inventive processes described above.

The computing device in FIG. 17 also includes a network controller 1706, such as an Intel Ethernet PRO network interface card from Intel Corporation of America, for interfacing with network 1760. As can be appreciated, the network 1760 can be a public network, such as the Internet, or a private network such as an LAN or WAN network, or any combination thereof and can also include PSTN or ISDN sub-networks. The network 1760 can also be wired, such as an Ethernet network, or can be wireless such as a cellular network including EDGE, 3G and 4G wireless cellular systems. The wireless network can also be Wi-Fi, Bluetooth, or any other wireless form of communication that is known.

The computing device further includes a display controller 1708, such as a NVIDIA Geforce GTX or Quadro graphics adaptor from NVIDIA Corporation of America for interfacing with display 1710, such as a Hewlett Packard HPL2445w LCD monitor. A general purpose I/O interface 1712 interfaces with a keyboard and/or mouse 1714 as well as a touch screen panel 1716 on or separate from display 1710. General purpose I/O interface also connects to a variety of peripherals 1718 including printers and scanners, such as an OfficeJet or DeskJet from Hewlett Packard.

A sound controller 1720 is also provided in the computing device such as Sound Blaster X-Fi Titanium from Creative, to interface with speakers/microphone 1722 thereby providing sounds and/or music.

The general purpose storage controller 1724 connects the storage medium disk 1704 with communication bus 1726, which may be an ISA, EISA, VESA, PCI, or similar, for interconnecting all of the components of the computing device. A description of the general features and functionality of the display 1710, keyboard and/or mouse 1714, as well as the display controller 1708, storage controller 1724, network controller 1706, sound controller 1720, and general purpose I/O interface 1712 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 18.

Figure 18:
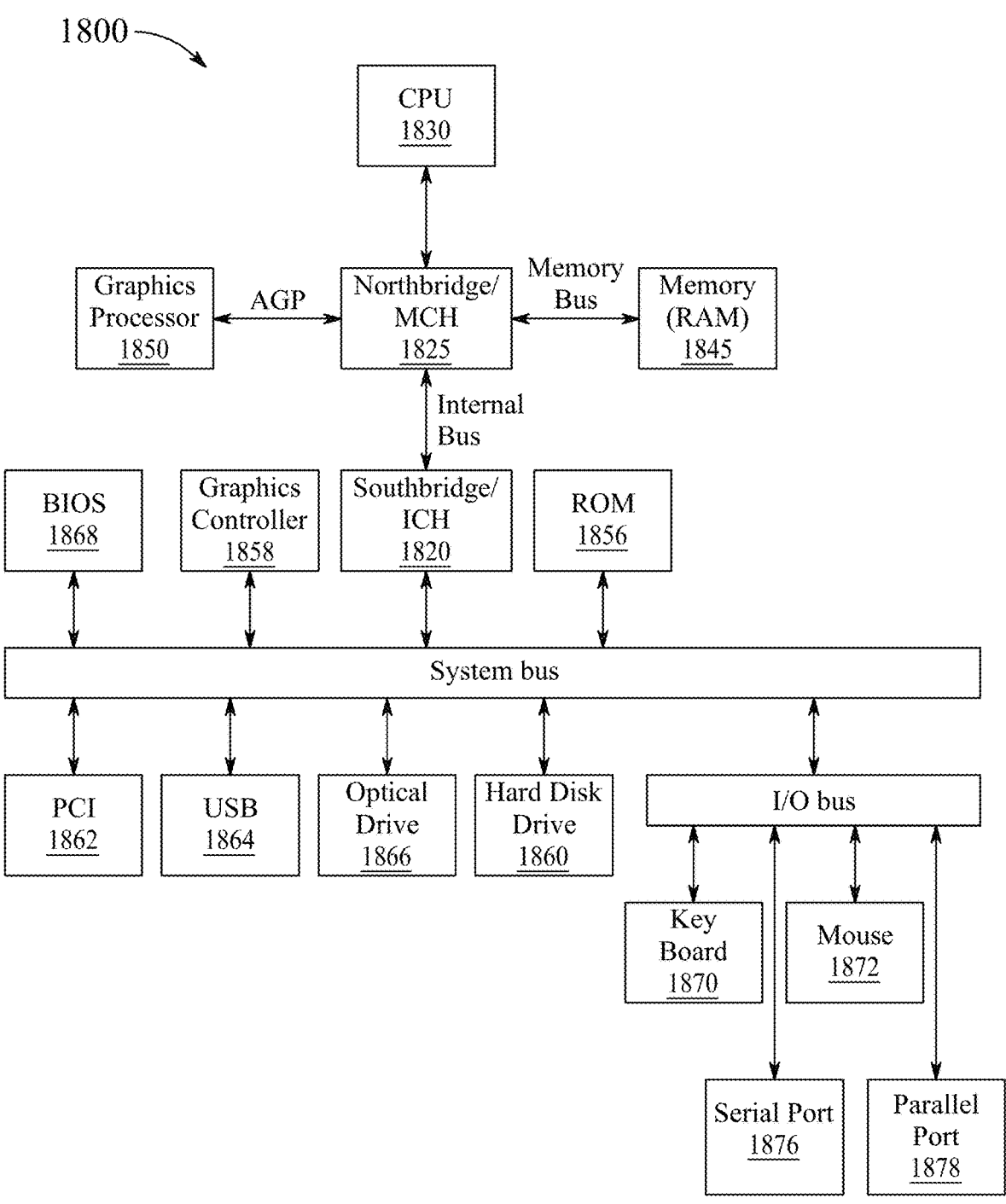
FIG. 18 is an exemplary schematic diagram of a data processing system used within the computing system, according to aspects of the present disclosure.
Figure 19:
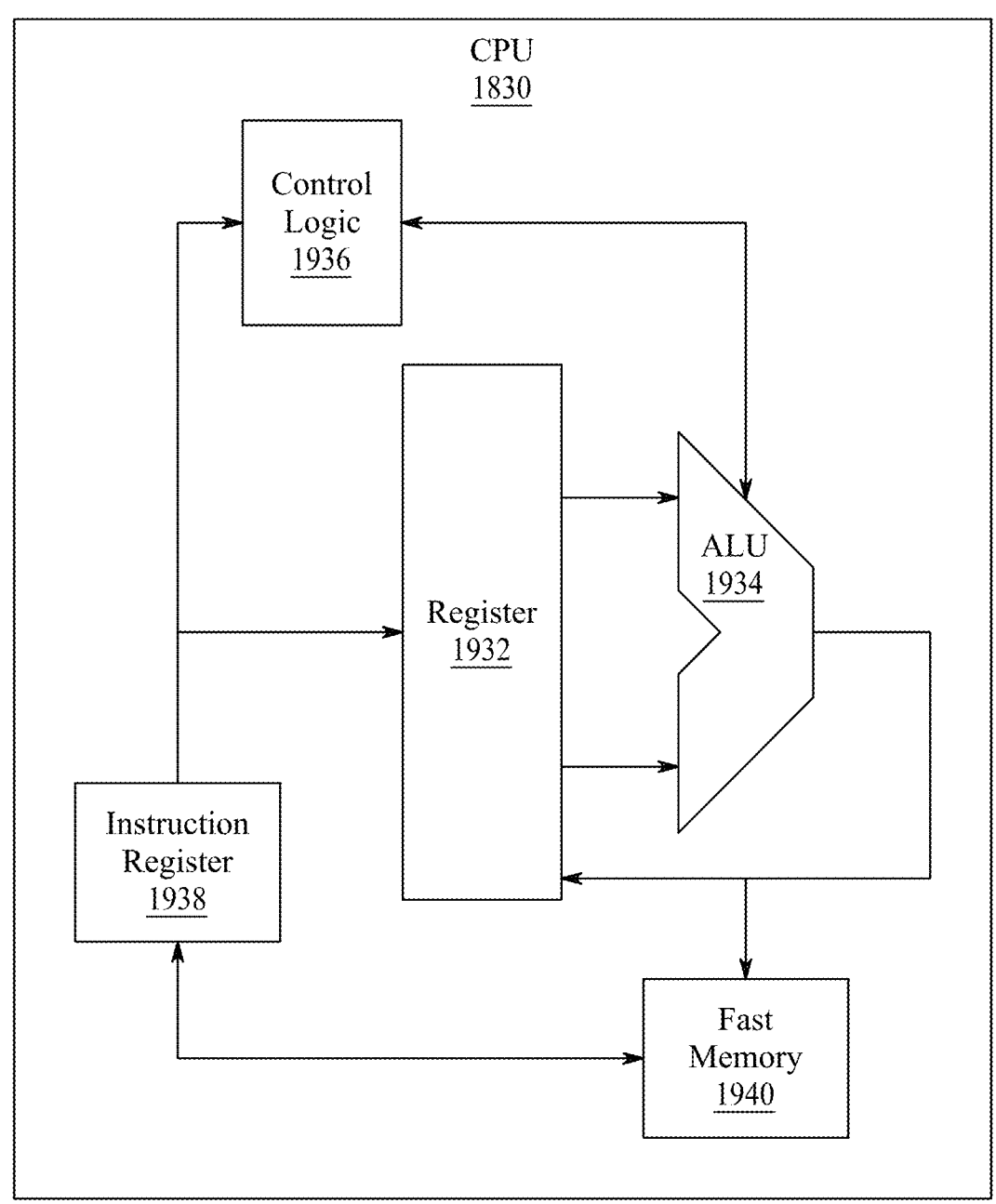
FIG. 19 is an exemplary schematic diagram of a processor used with the computing system, according to aspects of the present disclosure.

FIG. 18 shows a schematic diagram of a data processing system 1800 used within the computing system, according to exemplary aspects of the present disclosure. The data processing system 1800 is an example of a computer in which code or instructions implementing the processes of the illustrative aspects of the present disclosure may be located.

In FIG. 18, data processing system 1800 employs a hub architecture including a north bridge and memory controller hub (NB/MCH) 1825 and a south bridge and input/output (I/O) controller hub (SB/ICH) 1820. The central processing unit (CPU) 1830 is connected to NB/MCH 1825. The NB/MCH 1825 also connects to the memory 1845 via a memory bus, and connects to the graphics processor 1850 via an accelerated graphics port (AGP). The NB/MCH 1825 also connects to the SB/ICH 1820 via an internal bus (e.g., a unified media interface or a direct media interface). The CPU Processing unit 1830 may contain one or more processors and even may be implemented using one or more heterogeneous processor systems.

For example, FIG. 13 shows one aspects of the present disclosure of CPU 1830. In one aspects of the present disclosure, the instruction register 1938 retrieves instructions from the fast memory 1940. At least part of these instructions is fetched from the instruction register 1938 by the control logic 1936 and interpreted according to the instruction set architecture of the CPU 1830. Part of the instructions can also be directed to the register 1932. In one aspects of the present disclosure the instructions are decoded according to a hardwired method, and in other aspects of the present disclosure the instructions are decoded according to a microprogram that translates instructions into sets of CPU configuration signals that are applied sequentially over multiple clock pulses. After fetching and decoding the instructions, the instructions are executed using the arithmetic logic unit (ALU) 1934 that loads values from the register 1932 and performs logical and mathematical operations on the loaded values according to the instructions. The results from these operations can be feedback into the register and/or stored in the fast memory 1940. According to certain aspects of the present disclosures, the instruction set architecture of the CPU 1830 can use a reduced instruction set architecture, a complex instruction set architecture, a vector processor architecture, a very large instruction word architecture. Furthermore, the CPU 1830 can be based on the Von Neuman model or the Harvard model. The CPU 1830 can be a digital signal processor, an FPGA, an ASIC, a PLA, a PLD, or a CPLD. Further, the CPU 1830 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 18, the data processing system 1800 can include that the SB/ICH 1820 is coupled through a system bus to an I/O Bus, a read only memory (ROM) 1856, universal serial bus (USB) port 1864, a flash binary input/output system (BIOS) 1868, and a graphics controller 1858. PCI/PCIe devices can also be coupled to SB/ICH 1820 through a PCI bus 1862.

The PCI devices may include, for example, Ethernet adapters, add-in cards, and PC cards for notebook computers. The Hard disk drive 1860 and CD-ROM 1856 can use, for example, an integrated drive electronics (IDE) or serial advanced technology attachment (SATA) interface. In one aspects of the present disclosure the I/O bus can include a super I/O (SIO) device.

Further, the hard disk drive (HDD) 1860 and optical drive 1866 can also be coupled to the SB/ICH 1820 through a system bus. In one aspects of the present disclosure, a keyboard 1870, a mouse 1872, a parallel port 1878, and a serial port 1876 can be connected to the system bus through the I/O bus. Other peripherals and devices that can be connected to the SB/ICH 1920 using a mass storage controller such as SATA or PATA, an Ethernet port, an ISA bus, an LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

Figure 20:
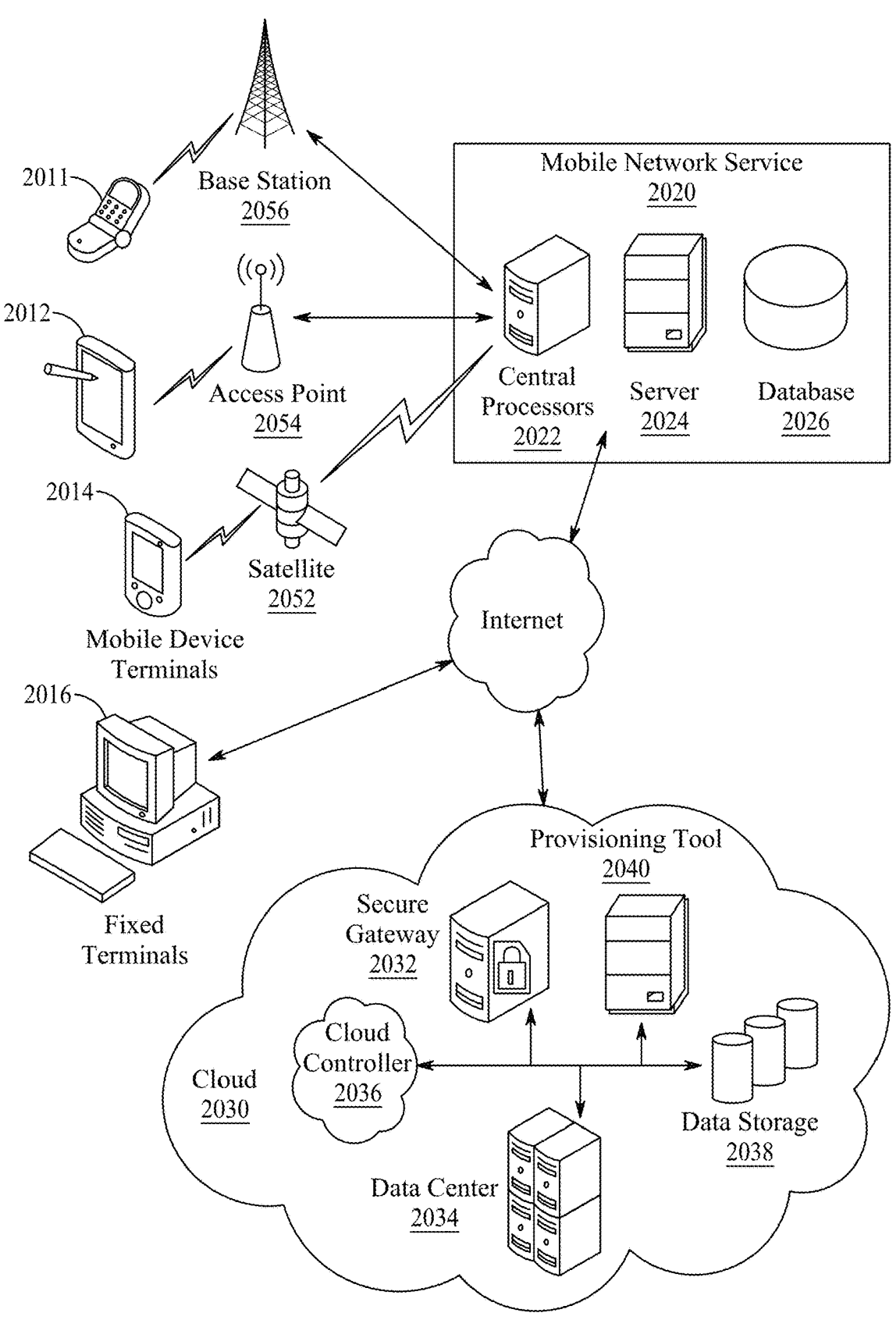
FIG. 20 is an illustration of a non-limiting example of distributed components which may share processing with the controller, according to aspects of the present disclosure.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 20, in addition to various human interface and communication devices (e.g., display monitors, smart phones, tablets, personal digital assistants (PDAs)). More specifically, FIG. 20 illustrates client devices including smart phone 2011, tablet 2012, mobile device terminal 2014 and fixed terminals 2016. These client devices may be commutatively coupled with a mobile network service 2020 via base station 2056, access point 2054, satellite 2052 or via an internet connection. Mobile network service 2020 may comprise central processors 2022, server 2024 and database 2026. Fixed terminals 2016 and mobile network service 2020 may be commutatively coupled via an internet connection to functions in cloud 2030 that may comprise security gateway 2032, data center 2034, cloud controller 2036, data storage 2038 and provisioning tool 2040. The network may be a private network, such as a LAN or WAN, or may be a public network, such as the Internet. Input to the system may be received via direct user input and received remotely either in real-time or as a batch process. Additionally, some aspects of the present disclosures may be performed on modules or hardware not identical to those described. Accordingly, other aspects of the present disclosures are within the scope that may be claimed.

The above-described hardware description is a non-limiting example of corresponding structure for performing the functionality described herein.

Aspects of the present disclosure are directed to targeting the regulation of voltage at the DC bus. In this regard, variations created were demonstrated projecting the variations of the regulation for photovoltaic arrays. Furthermore, load variations have also been presented. As such, theoretically, the proposed control design is applicable to any other power generation based on conventional and renewable energy based wherein power variation occurs.

Numerous modifications and variations of the present disclosure are possible in light of the above teachings. It is therefore to be understood that within the scope of the appended claims, the invention may be practiced otherwise than as specifically described herein.

The invention claimed is:

1. A hybrid energy storage system (HESS) for power management of a microgrid, comprising:

a plurality of renewable energy sources (RES) located within the microgrid, wherein each RES is configured to generate a current $I_{RES}$;

a plurality of power converters, wherein each RES is connected to a power converter, wherein each power converter generates a DC voltage $V_{dc}$ from the current $I_{RES}$;

a DC bus connected to the plurality of power converters, wherein the DC bus is configured to receive the DC voltage $V_{dc}$;

a power management controller configured to control:

a battery energy storage system (BESS) including a battery, wherein the battery is connected to receive the DC voltage $V_{dc}$ and generate a battery current $i_{batt}$;

a supercapacitor energy storage system (SCSS) including a supercapacitor, wherein the supercapacitor is connected to receive the DC voltage $V_{dc}$ and generate a supercapacitor current $i_{SC}$;

a first bidirectional converter connected across a positive terminal and a negative terminal of the battery; and a second bidirectional converter connected across a positive terminal and a negative terminal of the SCSS;

wherein the power management controller comprises:

a first adder configured to receive the DC voltage $V_{dc}$ from the DC bus, subtract the DC voltage $V_{DC}$ from a voltage reference $V_{ref}$, and generate a voltage error signal;

a voltage controller connected to the first adder, wherein the voltage controller is configured to receive the voltage error signal and generate a gain modified battery current;

a second adder connected to the voltage controller, wherein the second adder is configured to subtract the battery current $i_{batt}$ from the gain modified battery current and generate a battery current error signal;

a current controller connected to the second adder, wherein the current controller is configured to compensate a phase difference between the battery current $I_{batt}$ and the battery current error signal, and generate a phase and gain compensated battery current error signal;

a first pulse width modulator (PWM) controller connected to the current controller, wherein the first PWM controller is configured to generate a low power frequency current $I_{LPF}$ from the phase and gain compensated battery current error signal; and a battery switch $SW_b$ connected to the first PWM controller, wherein the first PWM controller is configured to actuate the battery switch $SW_b$ to transmit the low power frequency current $I_{LPF}$ to the first bidirectional converter, wherein the first bidirectional converter is configured to charge the battery with the low power frequency current, $I_{LPF}$.

2. The hybrid energy storage system of claim 1, wherein:

the voltage controller is a type II voltage compensator configured to adjust the gain of the DC voltage $V_{dc}$ to match a desired gain v; and the current controller is a type II current compensator configured to compensate the phase difference between the battery current $i_{batt}$ and the battery current error signal.

3. The hybrid energy storage system of claim 2, wherein the voltage controller is configured to adjust the gain of the DC voltage $V_{dc}$ to match the desired gain v by converting the voltage error signal to a frequency domain having a frequency s, identifying poles $w_z$ and $w_p$ in the voltage error signal in the frequency domain, and restricting a transfer function $H_T(s)$ of the voltage controller to:

$$H_T(s) = v\left(\frac{1 + \frac{w_z}{s}}{1 + \frac{s}{w_p}}\right).$$

4. The hybrid energy storage system of claim 3, wherein the current controller is configured to compensate the phase difference between the battery current $I_{batt}$ and the battery current error signal by boosting the phase such that:

$$f_p = \tan\left(\frac{\text{phase boost}}{2} + \frac{\pi}{4}\right)f_c$$

$$f_z = \frac{f_c}{\tan\left(\frac{\text{phase boost}}{2} + \frac{\pi}{4}\right)},$$

where $f_c$ is a zero crossover frequency of the poles.

5. The hybrid energy storage system of claim 1, wherein the power management controller further comprises:

a look up table LUT controller connected to the first adder, wherein the LUT controller is configured to receive the voltage error signal, match the voltage error signal to a corresponding supercapacitor current error signal, and generate an LUT current error signal;

a third adder connected to the LUT controller, wherein the third adder is configured to subtract the supercapacitor current $I_{SC}$, from the LUT current error signal and generate a supercapacitor current error signal;

a proportional integral (PI) controller configured to receive the supercapacitor current error signal, correct the supercapacitor current, $I_{SC}$, and generate a corrected supercapacitor current;

a second PWM controller connected to the PI controller, wherein the second PWM controller is configured to receive the corrected supercapacitor current and generate a high power frequency current, $I_{HPF}$; and a supercapacitor switch, $SW_{SC}$, connected to the second PWM controller, wherein the second PWM controller is configured to actuate the supercapacitor switch, $SW_b$, to transmit the high power frequency current, $I_{HPF}$, to the second bidirectional converter, wherein the second bidirectional converter is configured to charge the supercapacitor with the high power frequency current, $I_{HPF}$.

6. The hybrid energy storage system of claim 5, further comprising:

a point of common contact (PCC) configured to connect the hybrid energy storage system to any of an AC load, a DC load, and a utility grid, wherein:

the first bidirectional converter is connected to the PCC and configured to supply DC current and DC voltage from the battery to the PCC; and the second bidirectional converter is connected to the PCC and configured to supply AC current and AC voltage to the PCC.

7. A method for power management of a hybrid energy storage system (HESS) of a microgrid, comprising:

generating, by a plurality of renewable energy sources (RES) located within the microgrid, a current $I_{RES}$;

generating, by a plurality of power converters, wherein each RES is connected to a power converter, a DC voltage $V_{dc}$ from the current $I_{RES}$;

receiving, by a DC bus connected to the plurality of power converters, the DC voltage $V_{dc}$;

receiving, by a battery of a battery energy storage system (BESS), the DC voltage $V_{dc}$ and generating a battery current $i_{batt}$;

receiving, by a supercapacitor of a supercapacitor energy storage system (SCSS), the DC voltage $V_{dc}$ and generating a supercapacitor current $i_{SC}$, connecting a first bidirectional converter across a positive terminal and a negative terminal of the battery;

connecting a second bidirectional converter across a positive terminal and a negative terminal of the SCSS;

receiving, by a first adder, the DC voltage $V_{dc}$ from the DC bus, subtracting the DC voltage $V_{DC}$ from a voltage reference $V_{ref}$, and generating a voltage error signal;

receiving, by a voltage controller connected to the first adder, the voltage error signal and generating a gain modified battery current;

subtracting, by a second adder connected to the voltage controller, the battery current $I_{batt}$ from the gain modified battery current and generating a battery current error signal;

compensating, by a current controller connected to the second adder, a phase difference between the battery current $i_{batt}$ and the battery current error signal and generating a phase and gain compensated battery current error signal;

generating, by a first pulse width modulator (PWM) controller connected to the current controller, a low power frequency current $I_{LPF}$ from the phase and gain compensated battery current error signal;

actuating, a battery switch SW, by the first PWM controller, to transmit the low power frequency current $I_{LPF}$ to the first bidirectional converter; and charging the battery with the low power frequency current, $I_{LPF}$.

8. The method of claim 7, further comprising:

receiving, by a look up table LUT controller connected to the first adder, the voltage error signal;

matching, by the LUT controller, the voltage error signal to a corresponding supercapacitor current error signal;

generating, by the LUT controller, an LUT current error signal;

receiving, by a third adder connected to the LUT controller, the LUT current error signal;

subtracting, by the third adder, the supercapacitor current $i_{SC}$, from the LUT current error signal;

generating, by the third adder, a supercapacitor current error signal;

receiving, by a proportional integral (PI) controller, the supercapacitor current error signal;

correcting, by the PI controller, the supercapacitor current, $i_{SC}$;

generating, by the PI controller, a corrected supercapacitor current;

receiving, by a second PWM controller connected to the PI controller, the corrected supercapacitor current;

generating, by the second PWM controller, a high power frequency current, $I_{HPF}$;

actuating, by the second PWM controller, a supercapacitor switch $SW_{SC}$; and transmitting, by the supercapacitor switch $SW_{SC}$ the high power frequency current, $I_{HPF}$, to the second bidirectional converter, wherein the second bidirectional converter is configured to charge the supercapacitor with the high power frequency current, $I_{HPF}$.

9. The method of claim 8, further comprising:

connecting the first bidirectional converter is connected to a point of common contact (PCC);

supplying DC current and DC voltage from the battery to the PCC;

connecting the second bidirectional converter to the PCC; and supplying AC current and AC voltage to the PCC from the supercapacitor.

10. The method of claim 9, further comprising:

adjusting, by the voltage controller, the gain of the DC voltage $V_{dc}$ to match the desired gain v by:

converting the voltage error signal to a frequency domain having a frequency s, identifying poles $w_z$ and $w_p$ in the voltage error signal in the frequency domain, and restricting a transfer function $H_T(s)$ of the voltage controller to:

$$H_T(s) = v\left(\frac{1 + \frac{w_z}{s}}{1 + \frac{s}{w_p}}\right).$$

11. The method of claim 10, further comprising:

compensating, by the current controller, the phase difference between the battery current $I_{batt}$ and the battery current error signal by boosting the phase such that:

$$f_p = \tan\left(\frac{\text{phase boost}}{2} + \frac{\pi}{4}\right)f_c$$

$$f_z = \frac{f_c}{\tan\left(\frac{\text{phase boost}}{2} + \frac{\pi}{4}\right)},$$

where $f_c$ is a zero crossover frequency of the poles.

12. A non-transitory computer readable medium having instructions stored therein that, when executed by one or more processors, cause the one or more processors to perform a method for power management of a hybrid energy storage system (HESS) of a microgrid, comprising:

generating, by a plurality of renewable energy sources (RES) located within the microgrid, a current $I_{RES}$;

generating, by a plurality of power converters, wherein each RES is connected to a power converter, a DC voltage $V_{dc}$ from the current $I_{RES}$;

receiving, by a DC bus connected to the plurality of power converters, the DC voltage $V_{dc}$;

receiving, by a battery of a battery energy storage system (BESS), the DC voltage $V_{dc}$ and generating a battery current $i_{batt}$;

receiving, by a supercapacitor of a supercapacitor energy storage system (SCSS), the DC voltage $V_{dc}$ and generating a supercapacitor current $i_{SC}$;

receiving, by a first adder, the DC voltage $V_{dc}$ from the DC bus, subtracting the DC voltage $V_{DC}$ from a voltage reference $V_{ref}$, and generating a voltage error signal;

receiving, by a voltage controller connected to the first adder, the voltage error signal and generating a gain modified battery current;

subtracting, by a second adder connected to the voltage controller, the battery current $I_{batt}$ from the gain modified battery current and generating a battery current error signal;

compensating, by a current controller connected to the second adder, a phase difference between the battery current $I_{batt}$ and the battery current error signal and generating a phase and gain compensated battery current error signal;

generating, by a first pulse width modulator (PWM) controller connected to the current controller, a low power frequency current $I_{LPF}$ from the phase and gain compensated battery current error signal;

actuating, a battery switch $SW_b$ by the first PWM controller, to transmit the low power frequency current $I_{LPF}$ to a first bidirectional converter connected in parallel with the battery; and charging the battery with the low power frequency current, $I_{LPF}$.

13. The non-transitory computer readable medium method of claim 12, further comprising:

receiving, by a look up table LUT controller connected to the first adder, the voltage error signal;

matching, by the LUT controller, the voltage error signal to a corresponding supercapacitor current error signal;

generating, by the LUT controller, an LUT current error signal;

receiving, by a third adder connected to the LUT controller, the LUT current error signal;

subtracting, by the third adder, the supercapacitor current $I_{SC}$, from the LUT current error signal;

generating, by the third adder, a supercapacitor current error signal;

receiving, by a proportional integral (PI) controller, the supercapacitor current error signal;

correcting, by the PI controller, the supercapacitor current, $i_{SC}$;

generating, by the PI controller, a corrected supercapacitor current;

receiving, by a second PWM controller connected to the PI controller, the corrected supercapacitor current;

generating, by the second PWM controller, a high power frequency current, $I_{HPF}$;

actuating, by the second PWM controller, a supercapacitor switch $SW_{SC}$; and transmitting, by the supercapacitor switch $SW_{SC}$ the high power frequency current, $I_{HPF}$, to a second bidirectional converter connected in parallel with the supercapacitor, wherein the second bidirectional converter is configured to charge the supercapacitor with the high power frequency current, $I_{HPF}$.

14. The non-transitory computer readable medium method of claim 13, further comprising:

adjusting, by the voltage controller, the gain of the DC voltage $V_{dc}$ to match the desired gain v by:

converting the voltage error signal to a frequency domain having a frequency s, identifying poles $w_z$ and $w_p$ in the voltage error signal in the frequency domain, and restricting a transfer function $H_T(s)$ of the voltage controller to:

$$H_T(s) = v\left(\frac{1 + \dfrac{w_z}{s}}{1 + \dfrac{s}{w_p}}\right).$$

5

15. The non-transitory computer readable medium method of claim 14, further comprising:

compensating, by the current controller, the phase difference between the battery current $I_{batt}$ and the battery 10 current error signal by boosting the phase such that:

$$f_p = \tan\left(\frac{\text{phase boost}}{2} + \frac{\pi}{4}\right) f_c$$

15

$$f_z = \frac{f_c}{\tan\left(\dfrac{\text{phase boost}}{2} + \dfrac{\pi}{4}\right)},$$

20 where $f_c$ is a zero crossover frequency of the poles.

\* \* \* \* \*